United States Patent
Beck

(10) Patent No.: US 9,506,531 B2
(45) Date of Patent: *Nov. 29, 2016

(54) MULTI-STAGE POWER-SHIFT TRANSMISSION

(71) Applicant: ZF Friedrichshafen AG, Friedrichshafen (DE)

(72) Inventor: Stefan Beck, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 48 days.

This patent is subject to a terminal disclaimer.

(21) Appl. No.: 14/396,092

(22) PCT Filed: Mar. 13, 2013

(86) PCT No.: PCT/EP2013/055063
§ 371 (c)(1),
(2) Date: Oct. 22, 2014

(87) PCT Pub. No.: WO2013/159994
PCT Pub. Date: Oct. 31, 2013

(65) Prior Publication Data
US 2015/0080164 A1 Mar. 19, 2015

(30) Foreign Application Priority Data
Apr. 27, 2012 (DE) .................. 10 2012 207 099

(51) Int. Cl.
*F16H 3/66* (2006.01)
*F16H 3/44* (2006.01)

(52) U.S. Cl.
CPC .......... *F16H 3/66* (2013.01); *F16H 2003/445* (2013.01); *F16H 2200/0008* (2013.01);
(Continued)

(58) Field of Classification Search
None
See application file for complete search history.

(56) References Cited

U.S. PATENT DOCUMENTS

| 5,358,458 | A | 10/1994 | Hicks |
| 6,984,187 | B2 | 1/2006 | Biermann |
| 7,819,772 | B2 | 10/2010 | Tenberge |
| 8,388,488 | B2 | 3/2013 | Phillips et al. |
| 2004/0147358 | A1* | 7/2004 | Biermann ............... F16H 3/66 475/275 |
| 2006/0142111 | A1 | 6/2006 | Park |

(Continued)

FOREIGN PATENT DOCUMENTS

| DE | 2 065 400 | 8/1973 |
| DE | 691 06 861 T2 | 6/1995 |

(Continued)

OTHER PUBLICATIONS

German Search Report Corresponding to 10 2012 207 028.1 mailed Mar. 28, 2014.

(Continued)

*Primary Examiner* — Colby M Hansen
(74) *Attorney, Agent, or Firm* — Davis & Bujold, PLLC; Michael J. Bujold

(57) ABSTRACT

A power-shiftable multi-stage transmission in planetary design, between a drive shaft and an output shaft, in particular an automatic transmission for a vehicle. The multi-stage transmission has two parallel shaft sections, six shift elements, at least two spur-gear stages and three planetary gear sets, each of which has one sun gear, one ring gear, and one planet carrier having a plurality of planetary gears. The planet carrier is united in a carrier, and the two shaft sections can be connected to one another via the at least two spur-gear stages. Different transmission ratios between the drive shaft and the output shaft can be implemented by selective engagement of the six shift elements such that a plurality of forward gears, in particular nine forward gears, and at least one reverse gear, can be implemented.

19 Claims, 13 Drawing Sheets

(52) U.S. Cl.
CPC .......... *F16H2200/0065* (2013.01); *F16H 2200/0082* (2013.01); *F16H 2200/201* (2013.01); *F16H 2200/2046* (2013.01)

(56) References Cited

U.S. PATENT DOCUMENTS

| | | |
|---|---|---|
| 2009/0036252 A1 | 2/2009 | Phillips et al. |
| 2010/0035718 A1 | 2/2010 | Saitoh |
| 2011/0045941 A1* | 2/2011 | Gumpoltsberger ....... F16H 3/66 475/275 |
| 2012/0053003 A1 | 3/2012 | Hwang |
| 2012/0088626 A1* | 4/2012 | Phillips ............. F16H 3/66 475/275 |
| 2012/0088627 A1 | 4/2012 | Phillips |
| 2012/0094799 A1 | 4/2012 | Phillips |
| 2015/0087469 A1* | 3/2015 | Beck ................. B60K 6/48 475/275 |
| 2015/0126324 A1* | 5/2015 | Beck ................. F16H 3/66 475/275 |

FOREIGN PATENT DOCUMENTS

| | | |
|---|---|---|
| DE | 101 15 985 A1 | 10/2002 |
| DE | 10 2005 018 804 A1 | 7/2006 |
| DE | 10 2010 019 649 A1 | 1/2011 |
| DE | 10 2009 018 958 A1 | 2/2011 |
| DE | 10 2011 080 566 A1 | 2/2013 |

OTHER PUBLICATIONS

German Search Report Corresponding to 10 2012 207 099.0 mailed Jul. 10, 2014.
International Search Report Corresponding to PCT/EP2013/055065 mailed Jun. 26, 2013.
International Search Report Corresponding to PCT/EP2013/055063 mailed Jul. 23, 2013.
Written Opinion Corresponding to PCT/EP2013/055063 mailed Jul. 23, 2013.

* cited by examiner

| GEAR | ENGAGED SHIFT ELEMENT ||||||| GEAR RATIO | GEAR INTERVAL |
| | BRAKE || CLUTCH |||| | i | φ |
| | B1 | B2 | K1 | K2 | K3 | K4 | | |
|---|---|---|---|---|---|---|---|---|
| 1 |  | X |  |  | X | X | 5.171 | 1.666 |
| 2 |  |  |  | X | X | X | 3.103 | 1.416 |
| 3 |  | X |  | X |  | X | 2.191 | 1.322 |
| 4 |  |  | X | X |  | X | 1.657 | 1.343 |
| 5 |  | X | X | X |  |  | 1.234 | 1.234 |
| 6 |  |  | X | X | X |  | 1.000 | 1.182 |
| 7 |  | X | X |  | X |  | 0.846 | 1.230 |
| 8 | X |  | X |  | X |  | 0.688 | 1.197 |
| 9 | X | X | X |  |  |  | 0.575 | 8.993 |
| R | X | X |  |  |  | X | -4.965 | -0.960 |
| M4' | X |  | X |  |  | X | 1.657 ||
| M4" |  |  | X |  | X | X | 1.657 ||
| M4''' |  | X | X |  |  | X | 1.657 ||

Fig. 3

MULTI-STAGE POWER-SHIFT TRANSMISSION

This application is a National Stage completion of PCT/EP2013/055063 filed Mar. 13, 2013, which claims priority from German patent application serial no. 10 2012 207 099.0 filed Apr. 27, 2012.

FIELD OF THE INVENTION

The present invention relates to a power-shiftable multi-stage transmission in planetary design for a vehicle, which can be used as an automatic transmission, for example.

BACKGROUND OF THE INVENTION

Power-shiftable multi-stage transmissions are used as vehicle transmissions in drive trains of vehicles. Such multi-stage transmissions comprise a plurality of gear stages and a plurality of shift elements. Embodiments thereof exist for passenger vehicles having up to eight forward gears for front transverse installation or for longitudinal installation. Power-shiftable multi-stage transmissions having spur-gear stages and planetary gear stages are provided for implementing the transmission ratios. Multi-stage transmissions having planetary gear stages are usually automatic transmissions, which are shifted by means of friction elements or shift elements, such as clutches and brakes, for example. Such multi-stage transmissions are usually connected to a start-up element, such as a hydrodynamic torque converter or a fluid coupling. Such a start-up element is subjected to a slip effect and is selectively provided with a lock-up clutch. The known transmission concepts have specific advantages and specific disadvantages, and so these are interesting only for certain applications.

The patent document U.S. Pat. No. 7,819,772 B2 discloses a power-shiftable multi-stage transmission between a drive shaft and an output shaft. The multi-stage transmission comprises a plurality of gear stages and a plurality of shift elements.

SUMMARY OF THE INVENTION

Proceeding therefrom, the present invention provides an improved power-shiftable multi-stage transmission in planetary design for a vehicle. Advantageous embodiments will become apparent from the description that follows.

A power-shiftable multi-stage transmission in planetary design between a drive shaft and an output shaft, in particular an automatic transmission for a vehicle, comprises two parallel shaft sections, six shift elements, at least two spur-gear stages and three planetary gear sets, each of which has one sun gear, one ring gear, and one planet carrier having a plurality of planetary gears, wherein the planet carrier is united in a carrier. The two shaft sections can be connected to one another via the at least two spur-gear stages. Different transmission ratios between the drive shaft and the output shaft can be implemented by means of a selective engagement of the six shift elements. As a result, a plurality of forward gears, in particular at least nine forward gears, and at least one reverse gear can be implemented.

The vehicle can be a motor vehicle, for example a passenger vehicle, a truck, or any type of commercial vehicle. The vehicle can be equipped with an internal combustion engine and, simultaneously or alternatively, with an electric drive, that is to say, the vehicle can also be embodied as a hybrid vehicle. The splitting of the coupled planetary gear stages to only two shaft sections results in a short overall length and a compact overall arrangement.

A shift element can be a clutch or a brake, depending on the embodiment. A shift element can be embodied either as a friction-locking shift element or as a form-locking shift element. A shift element that is used can be embodied as a power-shifting clutch or a power-shifting brake. In particular, a shift element can be embodied as a force-locking clutch or a force-locking brake, such as a multi-disk clutch, a band brake, or a cone clutch, for example. Moreover, a shift element can be embodied as a form-locking brake or a form-locking clutch, such as a synchronizing mechanism or a claw clutch, for example. Different types of shift elements can be used for the six shift elements of the multi-stage transmission.

Known arrangements can be implemented for the spur-gear stages and the planetary gear sets. For example, the multi-stage transmission can comprise exactly two spur-gear stages, that is, no more than two spur-gear stages, or exactly three spur-gear stages, that is, no more than three spur-gear stages. In terms of the planetary gear sets, the multi-stage transmission can comprise, for example, exactly three planetary gear sets, that is, no more than three planetary gear sets.

For vehicles having a front transverse installation, a parallel arrangement of the two shaft sections, in particular, is advantageous. The drive shaft and the output shaft can therefore be disposed parallel to one another. The multi-stage transmission advantageously has a short axial design, which is ideal for the front transverse design. The multi-stage transmission is furthermore characterized by a relatively simple design, low costs and low weight, and a good transmission ratio range, low absolute rotational speeds, low relative rotational speeds, low planetary set torques and low shift element torques, good gearing efficiencies, and a compact design.

According to one embodiment, the multi-stage transmission is a 9-speed planetary power-shift transmission. The multi-stage transmission can also be used as a front transverse system by arranging the gear sets and the shift elements in a suitable manner. The multi-stage transmission can comprise at least nine forward gears. The multi-stage transmission can be embodied with three planetary gear sets.

The power-shiftable multi-stage transmission in planetary design can therefore have at least nine forward gears and one reverse gear, as well as a gear ratio that is very well suited for motor vehicles and has a high overall gear ratio spread and favorable step changes. The transmission can implement a high start-up gear ratio in the forward direction and can contain a direct gear. In this case, the multi-stage transmission has a relatively simple design and is characterized, in particular, by a low number of shift elements, and eliminates double shifts when shifting sequentially. As a result, when shifting is implemented in defined groups of gears, it is possible in each case to disengage only one previously engaged shift element and engage one previously disengaged shift element.

In terms of the multi-stage transmission, two basic arrangements can be implemented, which are referred to in the following as the first and second main systems. In the first main system, the three planetary gear sets are disposed on the first shaft section. In the second main system, two of the three planetary gear sets are disposed on the first shaft section and one of the three planetary gear sets is disposed on the second shaft section, wherein one additional spur-gear stage is required as compared to the first main system.

Different variant embodiments can also be implemented for the two main systems. To this end, shift elements in one power path of the transmission can be disposed in an equally acting manner at different points of the power path. In particular, various possibilities for coupling to the different shafts of the multi-stage transmission result for the shift elements referred to in the following as the first and fourth shift elements. An entire family of transmissions can be obtained as a result.

Embodiments of the first main system are described in the following.

In this case, the three planetary gear sets and the drive shaft can be disposed on a first shaft section of the two parallel shaft sections. The output shaft can be disposed on a second shaft section of the two parallel shaft sections. The two parallel shaft sections can be connected to one another via the two spur-gear stages. A sun gear of a second planetary gear set of the three planetary gear sets and the drive shaft can be connected to one another in a rotationally fixed manner and form a first connection element. A ring gear of a third planetary gear set of the three planetary gear sets and the carrier of the second planetary gear set can be connected to one another in a rotationally fixed manner and form a third connection element. A sun gear of a first planetary gear set of the three planetary gear sets, a first spur gear of a second spur-gear stage of the at least two spur-gear stages, and a ring gear of the second planetary gear set can be connected to one another via a second, fourth, and fourteenth connection element. In this case, the second, fourth, and fourteenth connection elements can have a common connection point. Furthermore, the second connection element can be connected to the sun gear of the first planetary gear set. Furthermore, the fourth connection element can be connected to the ring gear of the second planetary gear set. Furthermore, the fourteenth connection element can be connected to the first spur gear of the second spur-gear stage. A first spur gear of a first spur-gear stage of the at least two spur-gear stages and a ring gear of the first planetary gear set can be connected to one another and form a fifth connection element. A second spur gear of the first spur-gear stage and the output shaft can be connected to one another and form a sixth connection element. A carrier of the first planetary gear set and the output shaft can be connected to one another and form a seventh connection element. A second spur gear of the second spur-gear stage and the output shaft can be connected to one another and form an eighth connection element. A second shift element of the six shift elements can be disposed in the power flow between the drive shaft and a carrier of the third planetary gear set. A third shift element of the six shift elements can be disposed in the power flow between the fourth connection element and the carrier of the third planetary gear set. A fifth shift element of the six shift elements can be disposed in the power flow between the carrier of the third planetary gear set and a transmission housing. A sixth shift element of the six shift elements can be disposed in the power flow between the sun gear of the third planetary gear set and the transmission housing.

The expression "in the power flow" means that a force can be transferred via the respective shift element if the respective shift element is engaged. If the shift element is disengaged, however, force cannot be transferred via the respective shift element and the power flow can therefore be interrupted.

A connection element can be a shaft. Depending on the embodiment, a connection element can be either a rigid element or an element formed of at least two sub-elements coupled via a clutch. Therefore, two elements connected by means of one connection element can be connected to one another in a rotationally fixed manner and, for example, form a rigid shaft. As an alternative, a connection element can comprise a clutch. In principle, a freewheel to the housing or to another shaft can be disposed on each shaft of the multi-stage transmission.

For the first main system in question, some of the shift elements can be disposed at different points of the power path without this resulting in a change in the transmission ratios or a shift matrix. In different variant embodiments, for instance, power paths in the transmission can be connected or disconnected at different points via clutches, namely the first and fourth shift elements in this case, wherein this can take place in an equally acting manner at various points of a power path. This results in the alternative embodiments of the first main system, which are described in the following.

In one embodiment of the first main system, the seventh connection element can comprise a first shift element of the six shift elements. In this case, the first shift element can be disposed in the power flow between the drive shaft and the carrier of the first planetary gear set.

In a further embodiment of the first main system, the second connection element can comprise the first shift element. In this case, the first shift element can be disposed in the power flow between the common connection point of the second, fourth, and fourteenth connection elements and the sun gear of the first planetary gear set.

In a further embodiment of the first main system, the fifth connection element can comprise the first shift element. In this case, the first shift element can be disposed in the power flow between a ring gear of the first planetary gear set and a first spur gear of the first spur-gear stage.

In a further embodiment of the first main system, the sixth connection element can comprise the first shift element. In this case, the first shift element can be disposed in the power flow between a second spur gear of the first spur-gear stage and the output shaft.

Embodiments of the second main system are described in the following.

In contrast to the aforementioned first main system, in the second main system, one of the planetary gear sets can be disposed on the second shaft section. In this case, the planetary gear set disposed on the second shaft section can be coupled in at least two different manners to the spur-gear stages while retaining the level of the stationary transmission ratios and the level of the transmission ratios of the main system.

According to the second main system, two planetary gear sets and the drive shaft can be disposed on a first shaft section of the two parallel shaft sections. A first planetary gear set of the three planetary gear sets and the output shaft can be disposed on a second shaft section of the two parallel shaft sections. The two parallel shaft sections can be connected to one another via three spur-gear stages. A sun gear of a second planetary gear set of the three planetary gear sets and the drive shaft can be connected to one another in a rotationally fixed manner and form a first connection element. A ring gear of a third planetary gear set of the three planetary gear sets and the carrier of the second planetary gear set can be connected to one another in a rotationally fixed manner and form a third connection element. A ring gear of the second planetary gear set and a first spur gear of a second spur-gear stage of the at least two spur-gear stages can be connected to one another and form a fourth connection element. A second spur gear of the second spur-gear stage and the output shaft can be connected and form an eighth connection element. The first spur gear of the second spur-gear stage, a first spur gear of a fourth spur-gear stage of the at least two spur-gear stages, and the fourth connection element can be connected to one another, wherein the connection between the first spur gear of the fourth spur-gear stage of the at least two spur-gear stages and the fourth connection element form a ninth connection element, and the connection between the first spur gear of the second spur-gear stage and the fourth and ninth connection elements form a fourteenth connection element. The output shaft and the ring gear of the first planetary gear set can be connected and form a tenth connection element. A first spur gear of a third spur-gear stage of the at least two spur-gear stages and the drive shaft can be connected to one another and form a thirteenth connection element. The drive shaft can be connected to the carrier of the third planetary gear set by means of a second shift element of the six shift elements. The carrier of the third planetary gear set having the connection of the first spur gear of the second spur-gear stage can be connected to the ring gear of the second planetary gear set by means of a third shift element of the six shift elements. A fifth shift element of the six shift elements can be disposed in the power flow between the carrier of the third planetary gear set and the transmission housing. A sixth shift element of the six shift elements can be disposed in the power flow between the sun gear of the third planetary gear set and the transmission housing. A second spur gear of the fourth spur-gear stage and the carrier of the first planetary gear set can be connected and form an eleventh connection element. A second spur gear of the third spur-gear stage and the sun gear of the first planetary gear set can be connected and form a twelfth connection element.

As an alternative thereto, according to the second main system, two planetary gear sets and the drive shaft can be disposed on a first shaft section of the two parallel shaft sections. A first planetary gear set of the three planetary gear sets and the output shaft can be disposed on a second shaft section of the two parallel shaft sections. The two parallel shaft sections can be connected to one another via three spur-gear stages. A sun gear of a second planetary gear set of the three planetary gear sets and the drive shaft can be connected to one another in a rotationally fixed manner and form a first connection element. A ring gear of a third planetary gear set of the three planetary gear sets and the carrier of the second planetary gear set can be connected to one another in a rotationally fixed manner and form a third connection element. A ring gear of the second planetary gear set and a first spur gear of a second spur-gear stage of the at least two spur-gear stages can be connected to one another and form a fourth connection element. A second spur gear of the second spur-gear stage and the output shaft can be connected and form an eighth connection element. The carrier of the second planetary gear set and a first spur gear of a fourth spur-gear stage of the at least two spur-gear stages can be connected in a rotationally fixed manner and form a ninth connection element. The output shaft and the ring gear of the first planetary gear set can be connected in a rotationally fixed manner and form a tenth connection element. A first spur gear of a third spur-gear stage of the at least two spur-gear stages and the drive shaft can be connected and form a thirteenth connection element. The drive shaft can be connected to the carrier of the third planetary gear set by means of a second shift element of the six shift elements. The carrier of the third planetary gear set having the connection of the first spur gear of the second spur-gear stage can be connected to the ring gear of the second planetary gear set by means of a third shift element of the six shift elements. A fifth shift element of the six shift elements can be disposed in the power flow between the carrier of the third planetary gear set and the transmission housing. A sixth shift element of the six shift elements can be disposed in the power flow between the sun gear of the third planetary gear set and the transmission housing. A second spur gear of the fourth spur-gear stage and the sun gear of the first planetary gear set can be connected and form an eleventh connection element. A second spur gear of the third spur-gear stage and the carrier of the first planetary gear set can be connected and form a twelfth connection element.

In a manner corresponding to the depiction of the first main system, equally acting, alternative variant embodiments of the second main system are also obtained by displacing shift elements on a power path. For instance, the first shift element can be positioned in an equally acting manner at at least five locations and the fourth shift element can be positioned in an equally acting manner at at least two locations.

According to one embodiment of the second main system, the thirteenth connection element can therefore comprise a first shift element of the six shift elements. In this case, the first shift element can be disposed in the power flow between the drive shaft and the spur gear of the third spur-gear stage.

According to a further embodiment of the second main system, the twelfth connection element can comprise a first shift element of the six shift elements.

According to a further embodiment of the second main system, the eleventh connection element can comprise a first shift element of the six shift elements.

According to a further embodiment of the second main system, the tenth connection element can comprise a first shift element of the six shift elements.

According to a further embodiment of the second main system, the ninth connection element can comprise a first shift element.

According to further embodiments of the two main systems, the eighth connection element can comprise a fourth shift element of the six shift elements. In this case, the fourth shift element can be disposed in the power flow between the second spur gear of the second spur-gear stage and the output shaft.

According to further embodiments of the two main systems, the fourteenth connection element can comprise a fourth shift element of the six shift elements. In this case, the fourteenth shift element can be disposed in the power flow between the fourth connection element or the ninth connection element and the first spur gear of the second spur-gear stage.

The hybridization of vehicles is becoming increasingly significant.

According to one embodiment, a power source can be disposed on the drive shaft. The power source can be a motor, for example an electric motor. The power source can be disposed axially parallel to the drive shaft. In a further example embodiment, the power source can be disposed directly on the drive shaft.

A further advantage of the multi-stage transmission presented here is that an electric machine can be additionally attached to each shaft as a generator and/or as an additional drive motor. As previously described, an electric machine or any other type of force/power supply can be disposed, in principle, on each shaft, which is also referred to as a connection element in this case. A connection to the drive shaft appears to make sense for the electric machine in particular, however. The electric machine can be connected to the drive shaft either directly or in an axially parallel manner via a pair of gears. These variants are possible for all the concepts presented.

According to the embodiments, all three planetary gear sets are designed, for example, as so-called minus planetary gear sets, the respective ring gears of which rotate, with the carrier held, in the direction counter to the sun gear.

In one embodiment of the present invention, at least one planetary gear set can be designed as a so-called plus planetary gear set if the above-described carrier and ring gear connection of the planetary gear set in question is exchanged and the stationary transmission ratio is adjusted. A plus planetary gear set is a planetary transmission in which the ring gear rotates in the same direction of rotation as the sun gear when the carrier is held. A minus planetary gear set comprises planetary gears, which are rotatably mounted on a planet carrier and mesh with the sun gear and ring gear of this planetary gear set such that, with the planet carrier held and the sun gear rotating, the ring gear rotates in the direction of rotation counter to that of the sun gear. A plus planetary gear set comprises inner and outer planetary gears, which are rotatably mounted on a planet carrier and are in tooth engagement with one another, wherein the sun gear of this planetary gear set meshes with the aforementioned inner planetary gears, and the ring gear of this planetary gear set meshes with the aforementioned outer planetary gears such that, with the planet carrier held and the sun gear rotating, the ring gear rotates in the same direction of rotation as the sun gear.

A point that applies in general for all the different embodiments is that, wherever a connection allows for it, individual, or a plurality of, minus planetary gear sets can be converted to plus planetary gear sets if the carrier and ring gear connection is simultaneously exchanged and the value of the stationary transmission ratio is increased by one.

According to one embodiment, the first forward gear of the multi-stage transmission can be implemented by engaging the third, fourth, and sixth shift elements. The second forward gear can be implemented by engaging the second, third, and fourth shift elements. The third forward gear can be implemented by engaging the second, fourth, and sixth shift elements. The fourth forward gear can be implemented by engaging the first, second, and fourth shift elements. The fifth forward gear can be implemented by engaging the first, second, and sixth shift elements. The sixth forward gear can be implemented by engaging the first, second, and third shift elements. The seventh forward gear can be implemented by engaging the first, third, and sixth shift elements. The eighth forward gear can be implemented by engaging the first, third, and fifth shift elements. The ninth forward gear can be implemented by engaging the first, fifth, and sixth shift elements. The reverse gear can be implemented by engaging the fourth, fifth, and sixth shift elements.

The transmission described can comprise the drive-side first shaft section and the output-side second shaft section. These two shaft sections can be connected by at least two power paths, to which the at least two spur-gear stages can belong. If power paths are disconnected by means of clutches, this can take place in an equivalent manner at any location within the power path. If such power paths can be connected to the transmission housing by means of brakes, this brake can also engage in an equivalent manner at other locations in the power path. Identical stationary transmission ratios can be obtained by means of different planetary transmission designs, which should be considered equivalent within the meaning of this invention.

BRIEF DESCRIPTION OF THE DRAWINGS

The invention is explained in greater detail, as an example, with reference to the attached drawings. In the drawings:

FIG. 3 shows a shift pattern, as an example, of a multi-stage transmission according to one example embodiment of the present invention;

DETAILED DESCRIPTION OF THE PREFERRED EMBODIMENTS

Figure 1:
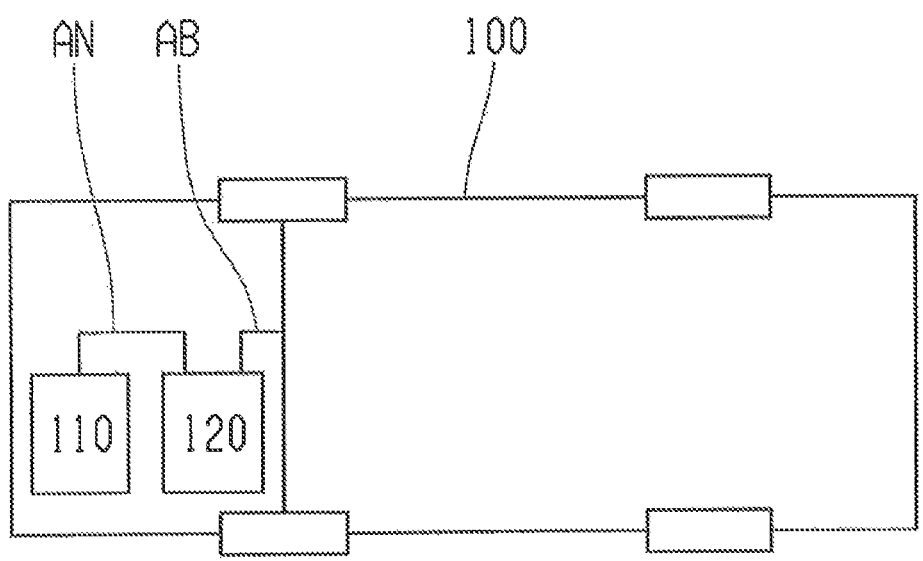
FIG. 1 shows a schematic depiction of a vehicle comprising a power-shiftable multi-stage transmission according to one example embodiment of the present invention.

In the following description of preferred example embodiments of the present invention, the same or similar reference characters are used for the similarly acting elements depicted in the various figures, wherein the description of these elements is not repeated.

Figure 9:
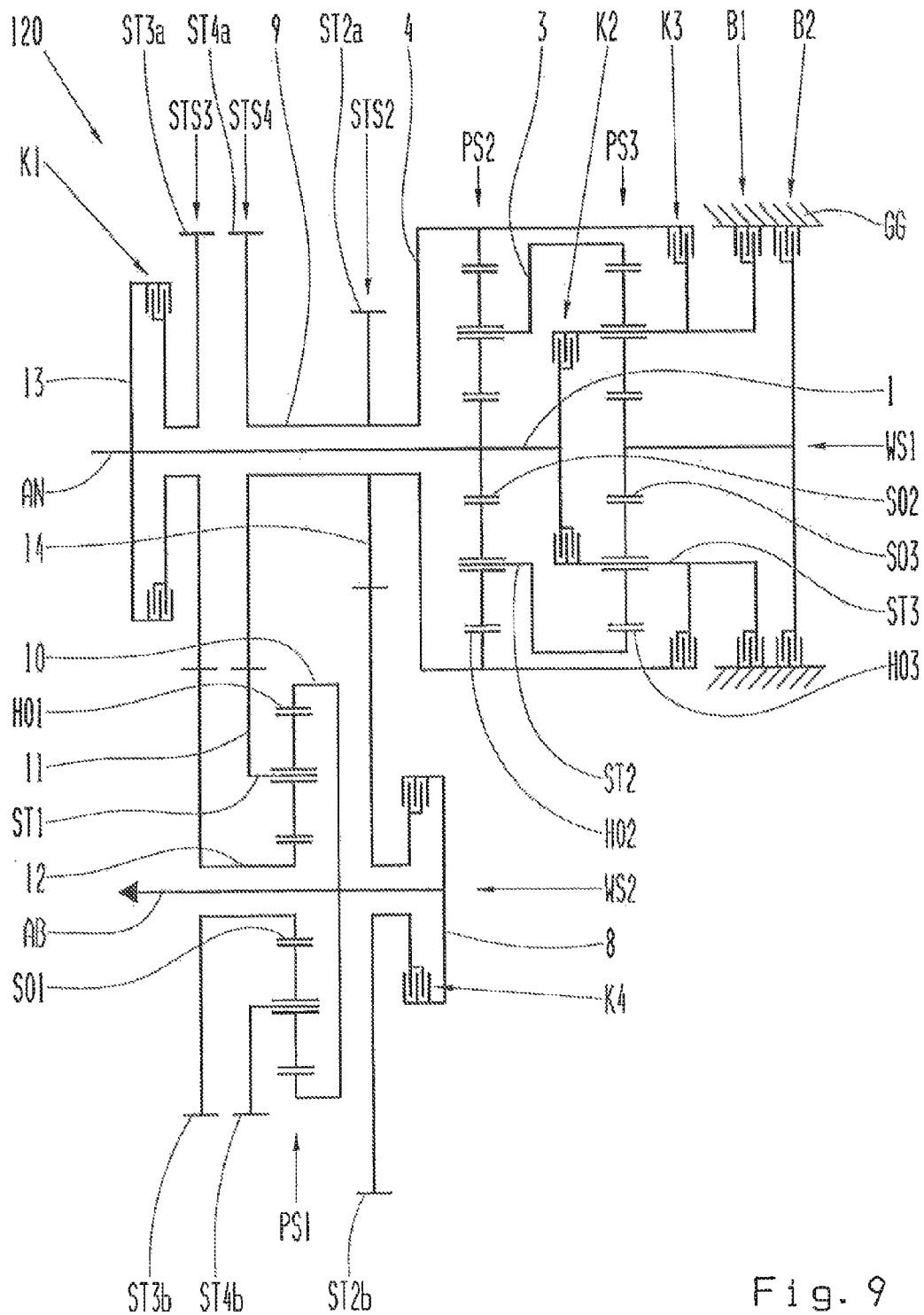
FIG. 9 shows a depiction of a second main system according to one example embodiment of the present invention.
Figure 10:
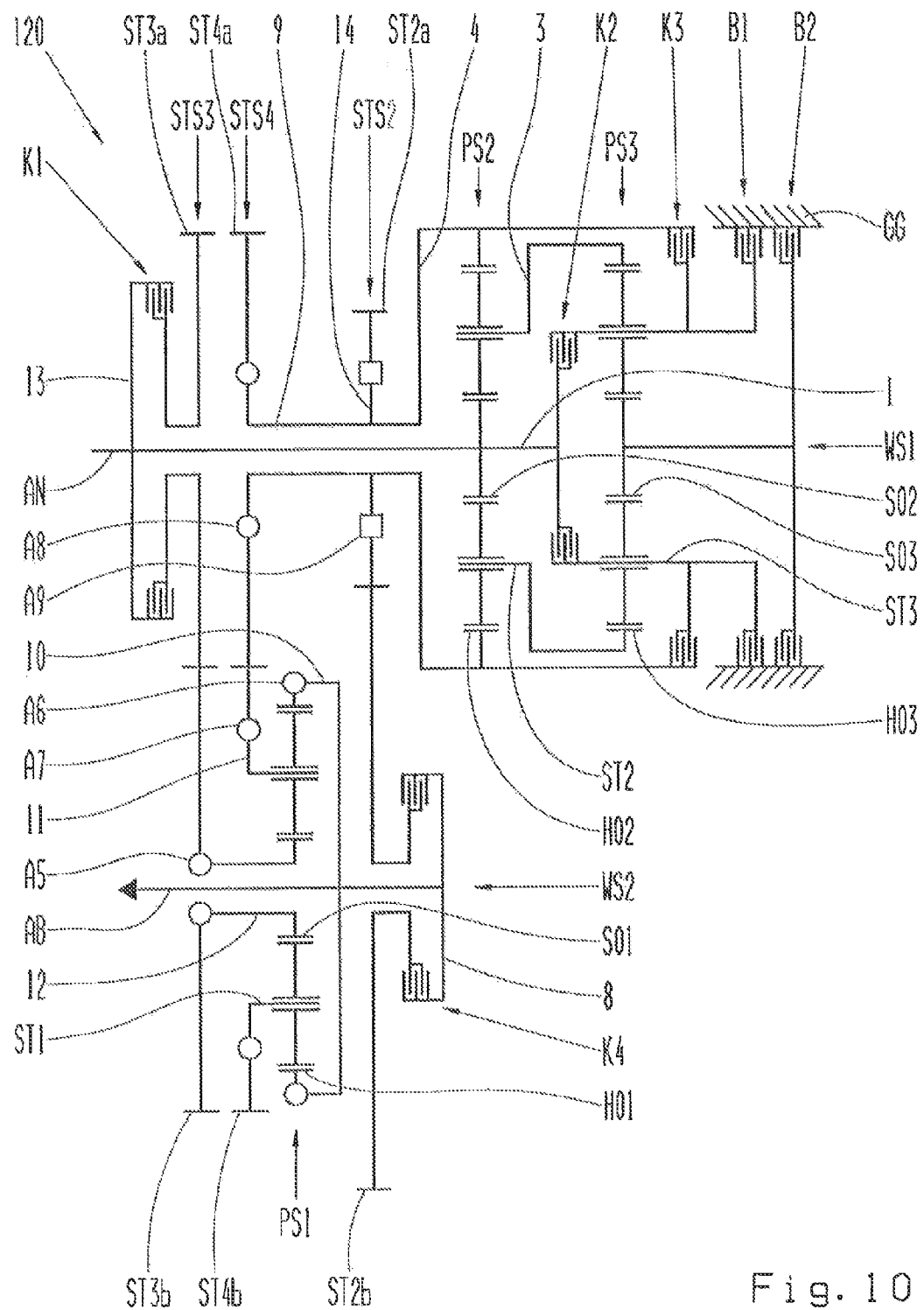
FIG. 10 shows variant embodiments of the second main system of a multi-stage transmission according to one example embodiment of the present invention.
Figure 11:
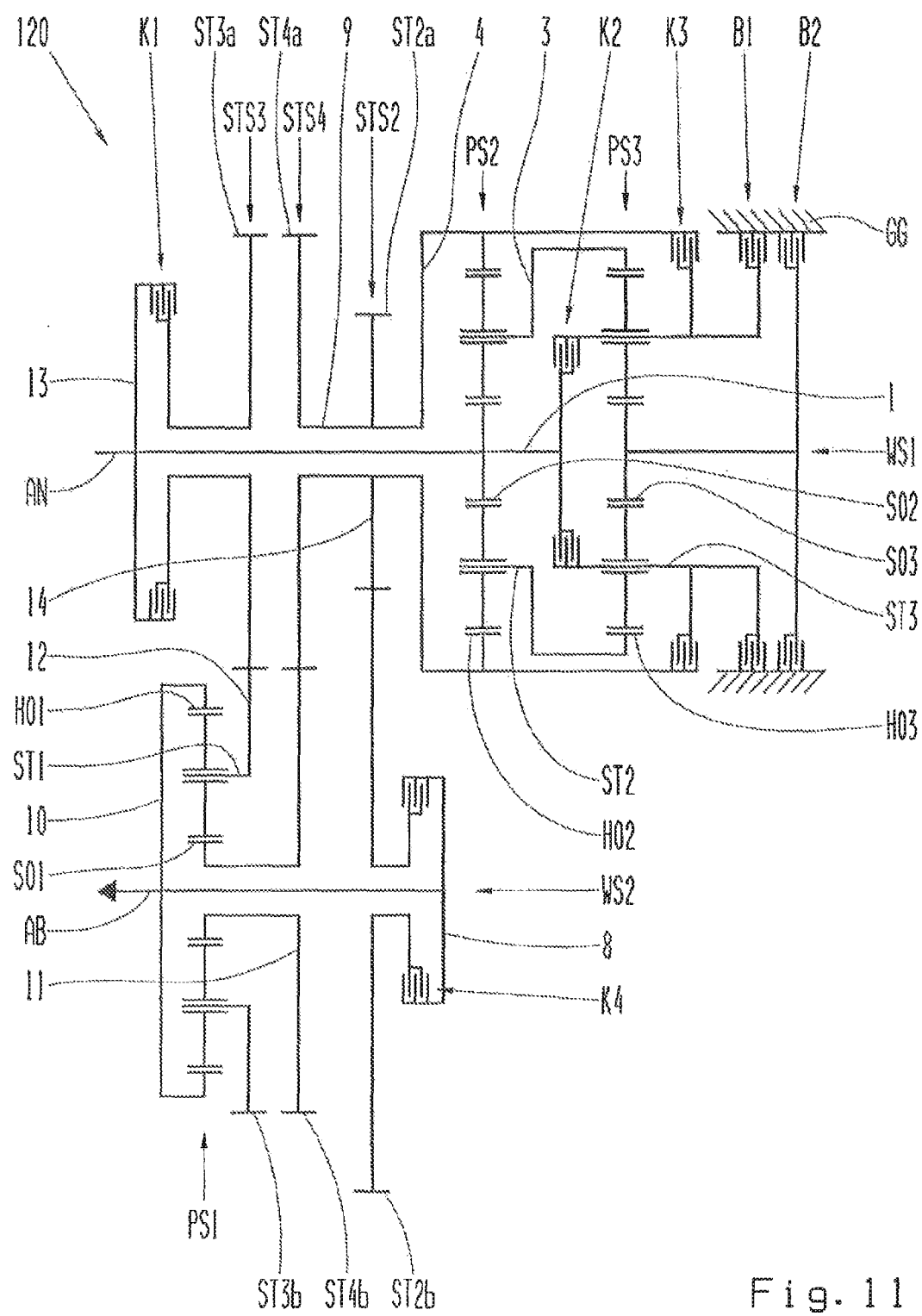
FIG. 11 shows a gear pattern of the second main system according to a further example embodiment of the present invention.
Figure 12:
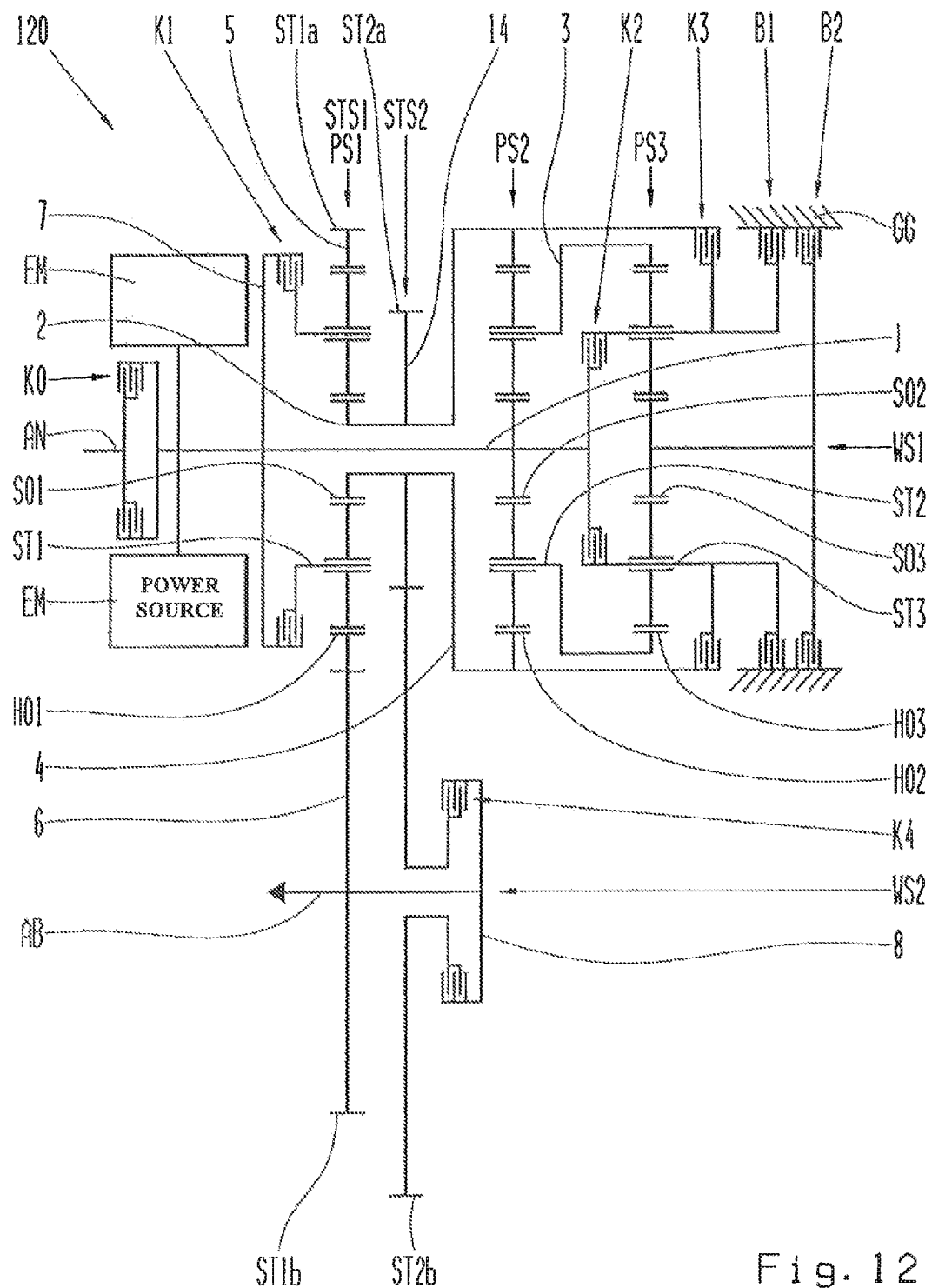
FIG. 12 shows a schematic depiction of the first main system comprising a power source, according to one example embodiment of the present invention.
Figure 13:
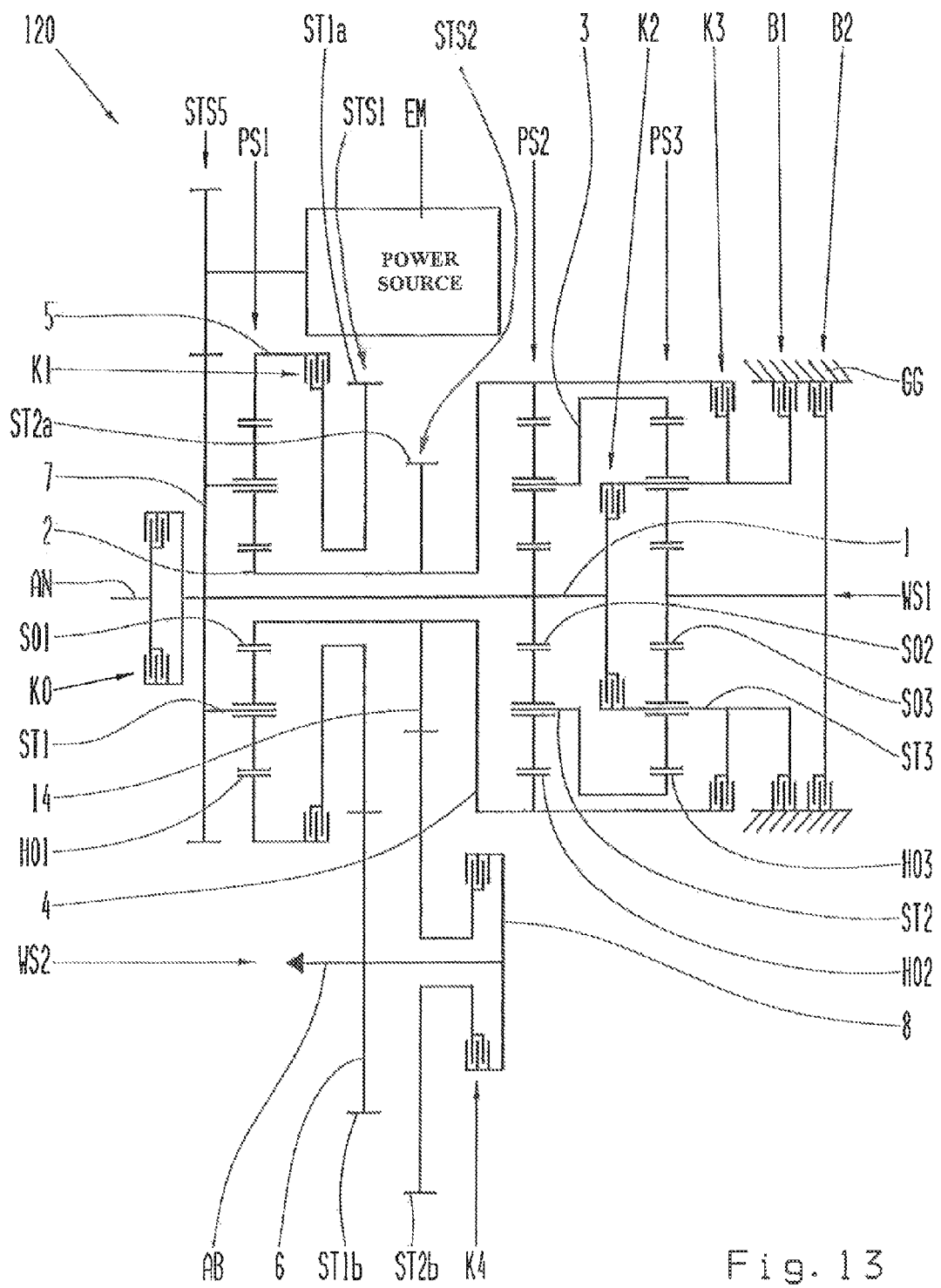
FIG. 13 shows a schematic depiction of a multi-stage transmission comprising a power source, according to one example embodiment of the present invention.

An overview of the use of a power-shiftable multi-stage transmission is presented in the following with reference to FIG. 1. A first main system of a power-shiftable multi-stage transmission will then be presented in FIG. 2 as an example embodiment of the present invention and will be subsequently described in different variant interlockings with reference to FIGS. 4 to 8. A second main system of a power-shiftable multi-stage transmission and different variant embodiments and interlockings thereof are depicted in FIGS. 9 to 11. FIGS. 12 and 13 show a hybridization of a power-shiftable multi-stage transmission using the first main system as an example. FIG. 3 shows a shift matrix for a power-shiftable multi-stage transmission according to the invention.

FIG. 1 shows a schematic depiction of a vehicle 100 comprising an engine 110 and a power-shiftable multi-stage transmission 120 in planetary design, according to one example embodiment of the present invention. The power-shiftable multi-stage transmission 120, which is also referred to as a planetary power-shift transmission or a power-shift unit, is installed in the vehicle 100 in a front transverse installation in this example embodiment. The engine 110, for example an internal combustion engine, is connected to the power-shiftable multi-stage transmission 120 by means of a drive shaft AN. An output shaft AB of the power-shiftable multi-stage transmission 120 connects the power-shiftable multi-stage transmission 120 to the front axle of the vehicle 100, in order to drive the vehicle 100.

According to one example embodiment, the power-shiftable multi-stage transmission 120 comprises three planetary gear sets, two or three spur-gear stages, and six shift elements, of which four are clutches and two are brakes, wherein two shift elements must be engaged simultaneously. The power-shiftable multi-stage transmission 120 does not comprise any fixed housing clutches and can shift nine forward gears and one reverse gear. The start-up element can be a hydrodynamic torque converter, a hydrodynamic clutch, an additional start-up clutch, an integrated start-up clutch or brake, an additional electric machine, or a power shuttle unit or a power-reversing unit.

Figure 2:
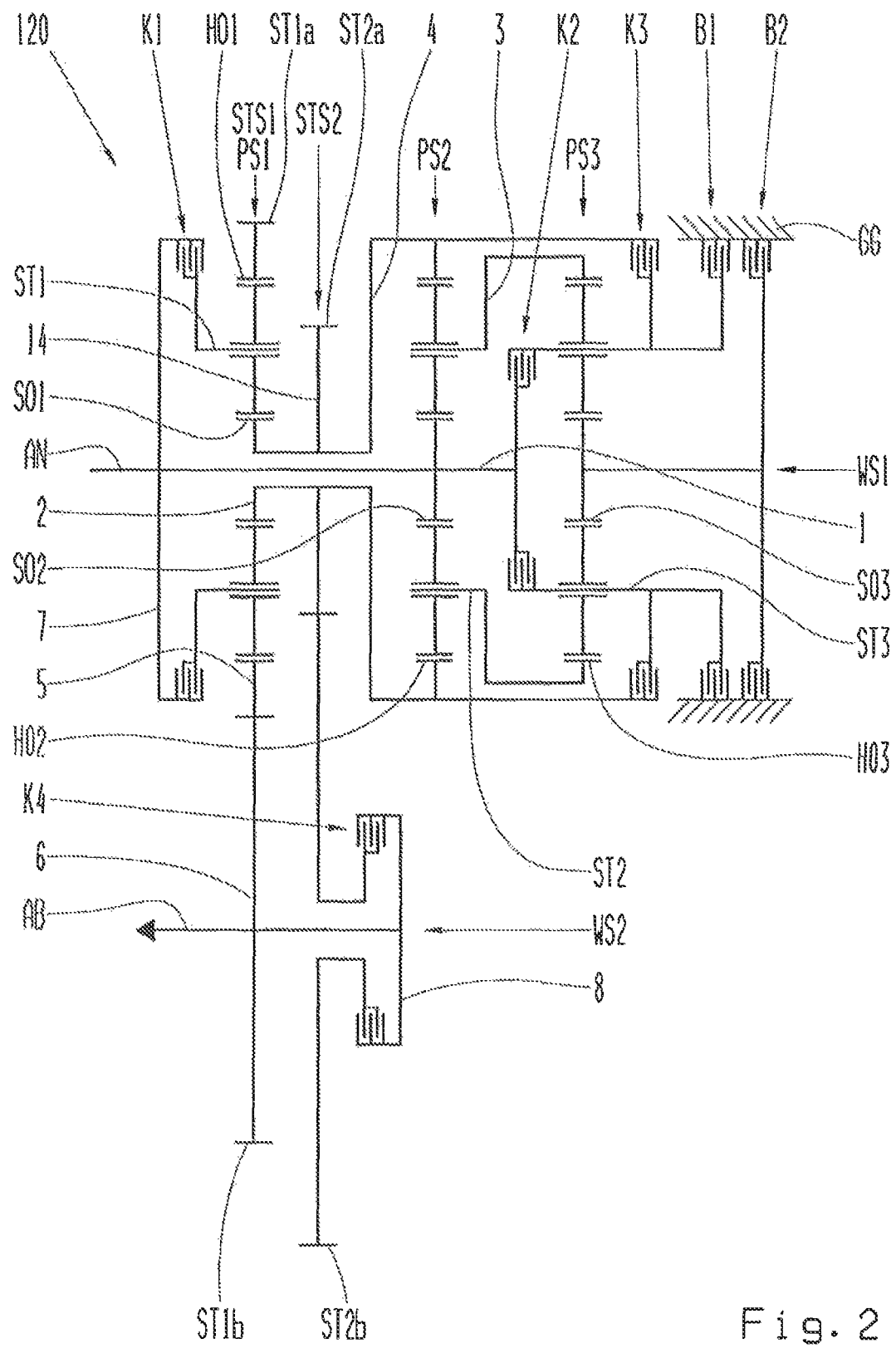
FIG. 2 shows a gear pattern of a 9-speed multi-stage transmission according to one example embodiment of the present invention.

FIG. 2 shows a gear pattern of a power-shiftable multi-stage transmission 120 according to one example embodiment of the present invention. The example embodiment shows an embodiment of a multi-stage transmission 120 that is referred to as the first main system. The power-shiftable multi-stage transmission 120 can be the multi-stage transmission 120 shown with reference to FIG. 1. The multi-stage transmission 120, which is also referred to as a planetary power-shift transmission, is embodied as a 9-speed multi-stage transmission according to this example embodiment.

The multi-stage transmission 120 comprises two parallel shaft sections WS1, WS2, six shift elements K1, K2, K3, K4, B1, B2, two spur-gear stages STS1, STS2, and three planetary gear sets PS1, PS2, PS3, all of which are disposed in a housing GG of the multi-stage transmission 120. In this example embodiment, all three planetary gear sets PS1, PS2, PS3 are embodied as simple minus planetary gear sets, the respective ring gears HO1, HO2, HO3 of which rotate, with the carrier ST1, ST2, ST3 held, in the direction counter to the sun gear SO1, SO2, SO3. As is known, a minus planetary gear set comprises planetary gears, which are rotatably mounted on a planet carrier and mesh with the sun gear and the ring gear of this planetary gear set. The three planetary gear sets PS1, PS2, PS3 are disposed in the axial direction coaxially and successively in the sequence "PS1, PS2, PS3" on the first shaft section WS1 of the two parallel shaft sections WS1, WS2.

A first spur gear ST1 a of a first spur-gear stage STS1 of the two spur-gear stages STS1, STS2 and a first spur gear ST2$a$ of a second spur-gear stage STS2 of the two spur-gear stages STS1, STS2 are disposed coaxially and successively on the first shaft section WS1 between the first planetary gear set PS1 and the second planetary gear set PS2.

The drive shaft AN is disposed on the first shaft section WS1, and the output shaft AB is disposed on a second shaft section WS2 of the two parallel shaft sections WS1, WS2. In addition, the two shaft sections WS1 WS2 are connected to one another via the two spur-gear stages STS1, STS2.

The shift elements K1, K2, K3, K4 are designed as clutches and the two shift elements B1, B2 are designed as brakes and are also referred to as such in the following. Different transmission ratios between the drive shaft AN and the output shaft AB can be implemented by means of a selective engagement of the six shift elements K1, K2, K3, K4, B1, B2. At least nine forward gears and at least one reverse gear can be implemented in this manner.

A coupling of the individual elements of the three planetary gear sets PS1, PS2, PS3 to one another, to the two spur-gear stages STS1, STS2, and to the drive shaft AN and to the output shaft AB are described in the following.

The multi-stage transmission 120 comprises at least nine connection elements, which are labeled 1 to 8 and 14. The connection elements 1, 2, 3, 4, 5, 6, 7, 8, 14 can be designed as shafts, wherein one or more shift elements can be disposed within the connection elements 1, 2, 3, 4, 5, 6, 7, 8, 14 in each case, as described in more detail in the following.

As shown in FIG. 2, a sun gear SO2 of a second planetary gear set PS2 of the three planetary gear sets PS1, PS2, PS3 and the drive shaft AN are connected to one another in a rotationally fixed manner and form a first connection element 1. A sun gear SO1 of a first planetary gear set PS1 of the three planetary gear sets PS1, PS2, PS3, a spur gear STS2$a$ of a second spur-gear stage STS2, and a ring gear HO2 of the second planetary gear set PS2 are connected to one another via a second, a fourth, and a fourteenth connection element 2, 4, 14. The second, fourth, and fourteenth connection elements 2, 4, 14 have a common connection point. The second connection element 2 is connected to the sun gear SO1 of the first planetary gear set PS1. The fourth connection element 4 is connected to the ring gear HO2 of the second planetary gear set PS2. The fourteenth connection element 14 is connected to the first spur gear ST2$a$ of the second spur-gear stage STS2. A ring gear HO3 of a third planetary gear set PS3 of the three planetary gear sets PS1, PS2, PS3 and the carrier ST2 of the second planetary gear set PS2 are connected to one another in a rotationally fixed manner and form a third connection element. The second connection element 2 and the fourth connection element 4 are connected to one another such that a connection also exists between the ring gear HO2 of the second planetary gear set PS2 and the sun gear SO1 of the first planetary gear set PS1. The first spur gear ST1$a$ of the first spur-gear stage STS1 is connected to a ring gear HO1 of the first planetary gear set PS1 and forms a fifth connection element 5. A second spur gear ST1$b$ of the first spur-gear stage STS1 and the output shaft AB are connected and form a sixth connection element 6. A carrier ST1 of the first planetary gear set PS1 is connected to the drive shaft AN and forms a seventh connection element 7. A second spur gear ST2$b$ of the second spur-gear stage STS2 and the output shaft AB are connected and form an eighth connection element 8.

The seventh connection element 7 comprises a first shift element K1 of the six shift elements K1, K2, K3, K4, B1, B2, wherein the first shift element K1 is disposed in the power flow between the drive shaft AN and the carrier ST1 of the first planetary gear set PS1. A second shift element K2 of the six shift elements K1 K2, K3, K4, B1, B2 is disposed in the power flow between the drive shaft AN and a carrier ST3 of the third planetary gear set PS3. A third shift element K3 of the six shift elements K1, K2, K3, K4, B1, B2 is disposed in the power flow between the rotationally fixed connection of the ring gear HO2 of the second planetary gear set PS2 to the spur gear ST2$a$ of the second spur-gear stage STS2 and the carrier ST3 of the third planetary gear set PS3. The eighth connection element 8 comprises a fourth shift element K4 of the six shift elements K1, K2, K3, K4, B1, B2, wherein the fourth shift element K4 is disposed in the power flow between the second spur gear ST2$b$ of the second spur-gear stage STS2 and the output shaft AB. A fifth shift element B1 of the six shift elements K1, K2, K3, K4, B1, B2 is disposed in the power flow between the carrier ST3 of the third planetary gear set PS3 and a transmission housing GG. A sixth shift element B2 of the six shift elements K1, K2, K3, K4, B1, B2 is disposed in the power flow between the sun gear SO3 of the third planetary gear set PS3 and the transmission housing GG.

In accordance with the spatial arrangement of the three planetary gear sets and the two first spur gears of the two spur-gear stages in the sequence "PS1/ST1a, ST2a, PS2, PS3" as viewed in the axial direction, the first connection element 1 of the multi-stage transmission 120 extends, in sections, so as to be centered between the second connection element 2 and the fourth connection element 4. In addition, the seventh connection element engages around the drive shaft AN or the first connection element 1 in the axial direction via the first shift element K1. The second shift element K2 engages completely around the third connection element 3 in the axial direction. The first spur gear ST1a of the first spur-gear stage is disposed radially above the first planetary gear set PS1.

In the example embodiment depicted in FIG. 2, the fifth shift element B1 and the sixth shift element B2, that is to say, the two brakes B1, B2, are disposed, from a spatial perspective, directly axially adjacent to one another in a region outside the sequence "PS1/ST1a, ST2a, PS2, PS3" next to the third planetary gear set PS3. In this case, the fifth shift element B1 is disposed between the third planetary gear set PS3 and the sixth shift element B2. The fifth and the sixth shift elements B1, B2 are connected to the transmission housing GG. In this example embodiment, the kinematic connection of the fifth and sixth shift elements B1, B2 to the third planetary gear set PS3 requires that the shift element B1 be disposed closer to the third planetary gear set PS3 than the shift element B2.

The spatial arrangement of the shift elements B1, B2 depicted in FIG. 2 shall be construed only as an example. For instance, the shift element B1 can also be disposed at least partially radially above the shift element B2 or, as an alternative, the sixth shift element B2 can be disposed in the region of the rotational axis of the first shaft section WS1.

In the example embodiment depicted in FIG. 2, the third shift element K3 is disposed axially directly next to the fifth shift element B1. The third connection element 3, the second shift element K2, and the third planetary gear set PS3 engage completely around the connection of the ring gear HO2 of the second planetary gear set PS2 to the third shift element K3, in the axial direction. The spatial arrangement of the two spur gears ST1b, ST2b of the two spur-gear stages STS1, STS2 on the second shaft section WS2 is in the form "ST1b, ST2b" as viewed in the axial direction. The fourth shift element K4 is directly and axially adjacent to the second spur gear ST2b of the second spur-gear stage STS2.

In one example embodiment, the first four shift elements K1, K2, K3, K4, that is to say, the four clutches, are designed as lamellar clutches that can be engaged in a friction-locking manner, which naturally can be implemented as claw clutches or cone clutches that can be engaged in a form-locking manner in another example embodiment. In one example embodiment, the shift elements B1, B2 designed as brakes are implemented as multi-disk brakes that can be engaged in a friction-locking manner, which naturally can also be implemented as band brakes that can be engaged in a friction-locking manner, or as claw brakes or cone brakes that can be engaged in a form-locking manner in other example embodiments.

A plurality of functionally identical, variant transmissions can be derived from the transmission 120 depicted in FIG. 2. The clutch K1 of the main system shown in FIG. 2 can be disposed in three other positions, which function in an identical manner. The clutch K4 can be disposed in one other position. This is explained in detail in FIG. 4, which follows.

FIG. 3 shows a shift pattern, as an example, of a multi-stage transmission according to one example embodiment of the present invention. The multi-stage transmission or the planetary power-shift transmission can be one of the multi-stage transmissions described in the preceding or in the following.

As viewed from left to right, gear steps representing one gear of the multi-stage transmission in each case are listed in the first column of the table shown in FIG. 3. An "x" is entered for each engaged shift element B1, B2, K1, K2, K3, K4 in the next six columns, which are reserved for the six shift elements B1, B2, K1, K2, K3, K4, which were previously described with reference to FIG. 2, for example. The two brakes B1 and B2 are listed first, followed by the four clutches K1, K2, K3, K4. If a shift element B1, B2, K1, K2, K3, K4 is engaged, force is transferred via the respective shift element B1, B2, K1, K2, K3, K4. The respective shift element B1, B2, K1, K2, K3, K4 can be a rigid connection element. The second-to-last column shows a transmission ratio i, as an example, followed by a resultant gear step $\varphi$ in the last column. The engaged shift elements, which are indicated with an "x", can also be referred to by the English language expression "engaged shifting elements". For each gear, three of the shift elements B1, B2, K1, K2, K3, K4 are disengaged and three of the shift elements B1, B2, K1, K2, K3, K4 are engaged.

In addition to the shift logic, example values for the respective transmission ratios i of the individual gear steps and the step changes $\varphi$ to be determined therefrom are also presented in the shift matrix. The transmission ratios presented result from the (typical) stationary transmission ratios of the three planetary gear sets PS1, PS2, PS3 of minus 1.600 for the first planetary gear set PS1, minus 1.600 for the second planetary gear set PS2, and minus 3.642 for the third planetary gear set and for the first spur-gear stage STS1 of 1.000 and for the second spur-gear stage STS2 of 3.228. The stationary transmission ratios of the spur-gear stages in this case can be changed within a design-related tolerance range without this substantially affecting the transmission ratios. Furthermore, the shift matrix shows that double shifts or group shifts are eliminated when shifting sequentially. Two adjacent gear steps use two of the necessary three shift elements. The sixth gear is preferably implemented as a direct gear. The transmission ratios presented and the variables derived therefrom represent a preferred embodiment. A person skilled in the art may also use other values here, in accordance with the requirements on the multi-stage transmission.

As previously described, for example with reference to FIG. 2, the six shift elements K1, K2, K3, K4, B1, B2 comprise the four clutches K1, K2, K3, K4 and the two brakes B1, B2. In the following description, the first four shift elements K1, K2, K3, K4 are referred to as clutches K1, K2, K3, K4, and the fifth and sixth shift elements B1, B2 are referred to as brakes B1, B2.

The first forward gear is implemented by engaging the brake B2 and the clutches K3, K4, the second forward gear is implemented by engaging the clutches K2, K3, K4, the third forward gear is implemented by engaging the brake B2 and the clutches K2, K4, the fourth forward gear is implemented by engaging the clutches K1, K2, K4, the fifth forward gear is implemented by engaging the brake B2 and the clutches K1, K2, the sixth forward gear is implemented by engaging the clutches K1, K2, K3, the seventh forward gear is implemented by engaging the brake B2 and the clutches K1, K3, the eighth forward gear is implemented by engaging the brake B1 and the two clutches K1, K3, and the ninth forward gear is implemented by engaging the two brakes B1, B2 and the clutch K1. The shift matrix in FIG. 3 also shows that the reverse gear is implemented by engaging the two brakes B1, B2 and the clutch K4.

The transmission ratio i can also be referred to by the English language expression "ratio". For the first gear, namely gear step 1, a transmission ratio i of 5.171 is obtained, for the second gear, namely gear step 2, a transmission ratio i of 3.103 is obtained, for the third gear a transmission ratio i of 2.191 is obtained, for the fourth gear a transmission ratio i of 1.657 is obtained, for the fifth gear a transmission ratio i of 1.234 is obtained, for the sixth gear a direct transmission ratio i of 1.000 is obtained, for the seventh gear a transmission ratio i of 0.846 is obtained, for the eighth gear a transmission ratio i of 0.688 is obtained, and for the ninth gear a transmission ratio i of 0.575 is obtained. The shift matrix also shows that a transmission ratio i of 4.965 is obtained for the reverse gear. Consequently, a gear increment $\phi$ or "step" of 1.666 results from the first gear to the second gear, a gear increment $\phi$ of 1.416 results from the second gear to the third gear, a gear increment $\phi$ of 1.322 results from the third gear to the fourth gear, a gear increment $\phi$ of 1.343 results from the fourth gear to the fifth gear, a gear increment $\phi$ of 1.234 results from the fifth gear to the sixth gear, a gear increment $\phi$ of 1.182 results from the sixth gear to the seventh gear, a gear increment $\phi$ of 1.230 results from the seventh gear to the eighth gear, and a gear increment $\phi$ of 1.197 results from the eighth gear to the ninth gear. The transmission therefore has a spread of 8.993. The ratio of the reverse gear to the first gear is minus 0.960 and is therefore very close to an ideal value of minus 1.

The multiple gears M4', M4'', M4''' listed in the first column are additional shift combinations, which also represent the fourth gear. The first multiple gear M4 is implemented by engaging the brake B1 and the clutches K1, K4, the second multiple gear M4'' is implemented by engaging the clutches K1, K3, K4, and the third multiple gear M4''' is implemented by engaging the brake B2 and the clutches K1, K4.

According to one example embodiment of the invention, the vehicle, for example the vehicle shown in FIG. 1, can be started up with a shift element integrated in the transmission. Particularly suitable therefor is a shift element that is required in the first forward gear and in the reverse gear, namely the brake B2 or the clutch K4 in this case. Advantageously, the clutch K4 is also required in the second forward gear. If the clutch K4 is used as the start-up element integrated in the transmission, it is therefore even possible to implement a start-up in the first four forward gears and the reverse gear.

In principle, the values of the stationary transmission ratios and, therefore, the values of the transmission ratios are freely selectable. According to one example embodiment, preferred stationary transmission ratios of the main system are −1.600 for the first planetary set PS1, −1.600 for the second planetary set PS2, −3.642 for the third planetary set PS3, and 1.00 for the spur-gear stage STS1 (ST1a-ST1b), 3.228 for the second spur-gear stage STS2 (ST2a-ST2b) and, for the variant embodiments having three spur-gear stages, as shown in FIGS. 9 to 11, these are 1.000 for the third spur-gear stage STS3 (ST3a-ST3b) and 1.000 for the fourth spur-gear stage STS4 (ST4a-ST4b). All the example embodiments shown in FIGS. 1 and 3 to 13 result in equally acting, variant embodiments, which can use the same shift matrix.

Possible variant interlockings of the multi-stage transmission shown in FIG. 2 are depicted in the following and in FIGS. 4 to 8. Any spatial arrangement of the shift elements K1, K2, K3, K4, B1, B2 of the example embodiment of a multi-stage transmission 120 depicted in FIG. 2 within the multi-stage transmission 120 is possible, in principle, and is limited only by the dimensions and the outer shape of the transmission housing GG. Accordingly, variant component arrangements of the multi-stage transmission according to FIG. 2 are depicted in the following figures, wherein all the kinematic couplings of the planetary gear sets, spur-gear stages, shift elements and shafts, and connection elements among one another are copied, unchanged, from FIG. 2.

Figure 4:
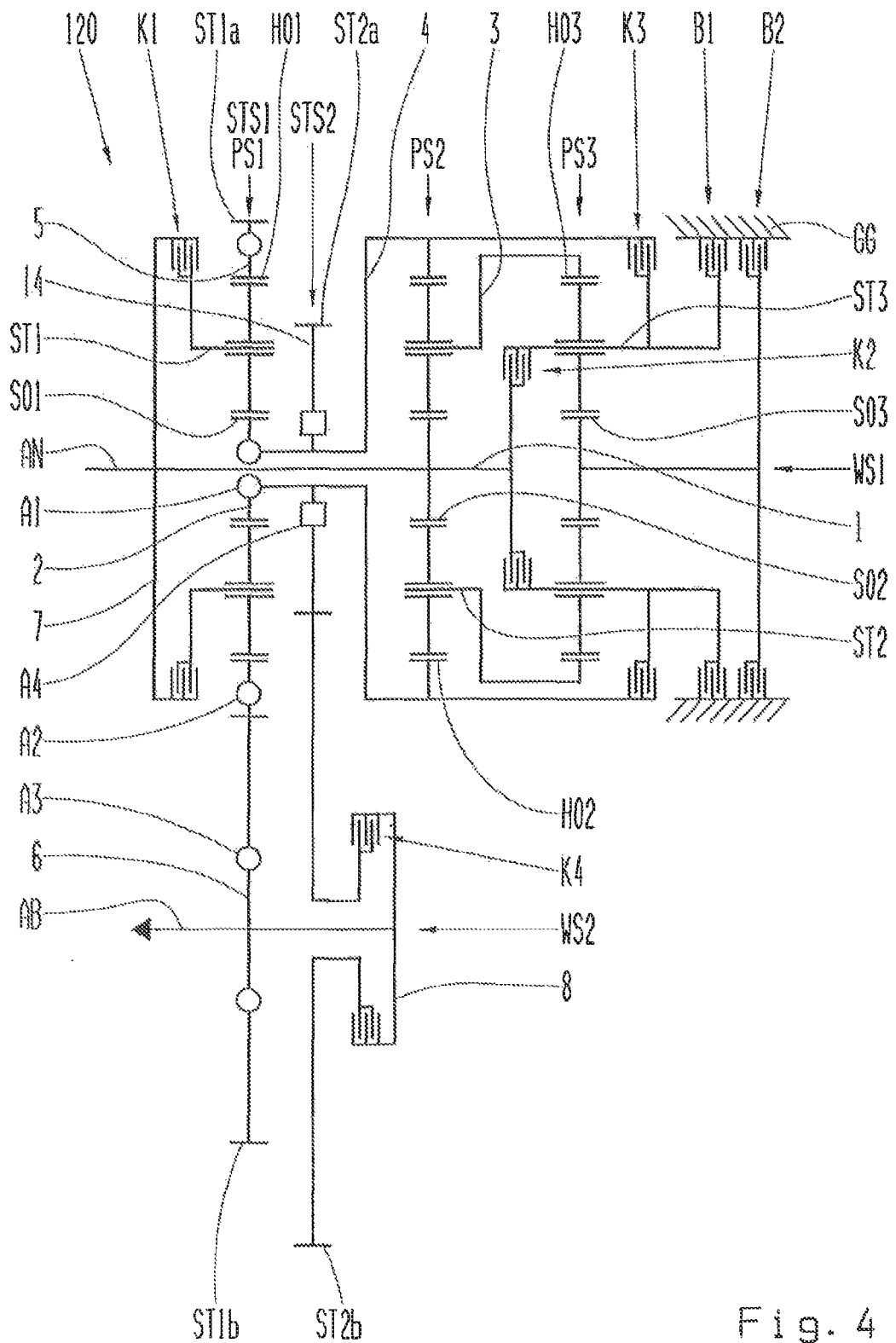
FIG. 4 shows variant embodiments of a first main system of a multi-stage transmission according to one example embodiment of the present invention.

FIG. 4 shows an overview of variant interlockings of the first main system of a multi-stage transmission 120, which was previously described with reference to FIG. 2, according to different example embodiments of the present invention, The gear pattern depicted in FIG. 4 corresponds to the gear pattern of a multi-stage transmission 120 depicted in FIG. 2, from which a plurality of equally acting, variant transmissions can be derived, wherein three additional, equally acting, variant positions are shown for the first shift element K1, i.e., the clutch K1, and one other variant position is shown for the fourth shift element K4, i.e., the clutch K4.

The three variant positions for the clutch K1 are labeled A1, A2, A3 in FIG. 4, and the variant position for the clutch K4 is labeled A4.

According to a first variant position A1 of the clutch K1, the clutch K1 is disposed on the second connection element 2 between the sun gear SO1 of the first planetary gear set and the fourth connection element 4. In the first variant position A1, the first shift element K1 is disposed in the power flow between the ring gear HO2 of the second planetary gear set PS2, the first spur gear ST2a of the second spur-gear stage STS2, and the sun gear SO1 of the first planetary gear set PS1.

According to a second variant position A2 of the clutch K1, the clutch K1 is disposed on the fifth connection element 5 between the ring gear HO1 of the first planetary gear set and the first spur gear ST1a of the first spur-gear set STS1. In the second variant position A2, the first shift element K1 is disposed in the power flow between a ring gear HO1 of the first planetary gear set PS1 and a first spur gear ST1a of the first spur-gear stage STS1.

According to a third variant position A3 of the clutch K1, the clutch K1 is disposed on the sixth connection element 6 between the second spur gear ST1b of the first spur-gear stage STS1 and the output shaft AB. In the third variant position A3, the first shift element K1 is disposed in the power flow between a second spur gear ST1b of the first spur-gear stage STS1 and the output shaft AB.

In one variant position A4 of the clutch K4, the fourth connection element 4 comprises the clutch K4. In the variant position A4 of the clutch K4, the fourth shift element K4 is disposed in the power flow between the ring gear HO2 of the second planetary gear set PS2 and the first spur gear ST2a of the second spur-gear stage STS2 and the sun gear SO1 of the first planetary gear set PS1. When the clutch K4 in the variant position A4 is disengaged, the first spur gear ST2a of the second spur-gear stage is decoupled from the connection of the sun gear SO1 of the first planetary gear set PS1 and the ring gear HO2 of the second planetary gear set PS2. In the fourth variant position A4, the fourth shift element K4 is disposed in the fourteenth connection element.

When the clutch K1 according to the first variant position A1 is disposed in the second connection element 2, the seventh connection element 7 establishes a rotationally-fixed connection between the drive shaft AN and the carrier ST1 of the first planetary gear set PS1, and the sun gear SO1 of the first planetary gear set can be coupled to the carrier ST2 of the second planetary gear set via the clutch K1. All eight combinations of the position for the clutch K1 depicted in FIG. 2 and the three variant positions A1, A2, A3 for the clutch K1 with the position for the clutch K4 depicted in FIG. 2 and the variant position A4 for the clutch K4 are possible. One of the possible variant positions A1, A2, A3, A4 for the clutches K1 and K4 is shown in the FIGS. 5 to 8, respectively, which follow.

Figure 5:
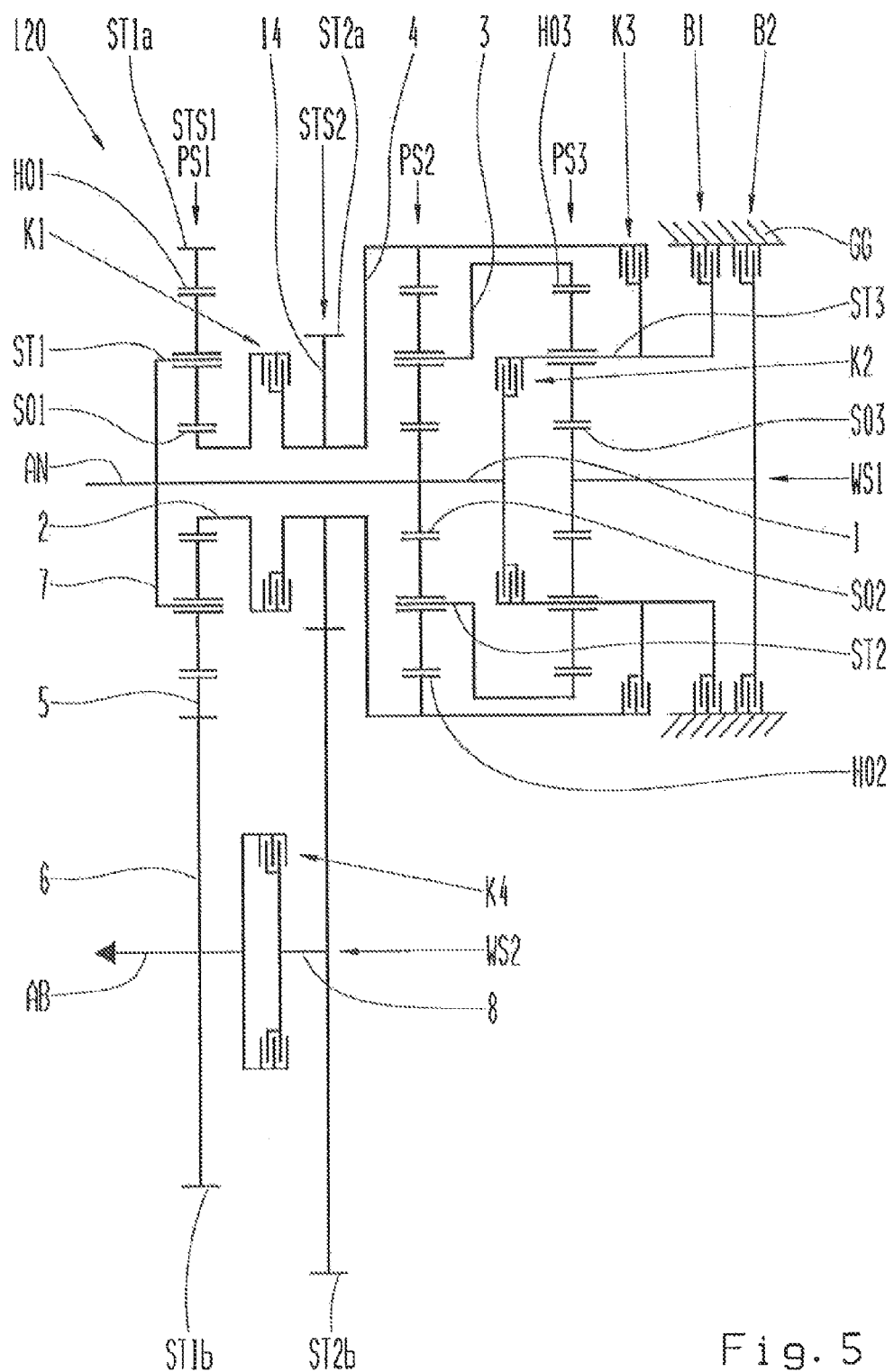
FIGS. 5 to 8 show schematic depictions of the first main system according to example embodiments of the present invention.

FIG. 5 shows a schematic depiction of another example embodiment of the first main system of the multi-stage transmission 120 previously described with reference to FIG. 2. This shows the first variant position for the clutch K1, which is labeled A1 in FIG. 4. In comparison to the transmission depicted in FIG. 4, the first spur-gear stage STS1 was axially displaced together with the first planetary gear set PS1 such that the clutch K1 can be spatially disposed between the first planetary gear set PS1 and the second spur-gear stage STS2. The fourth clutch K4 is disposed spatially differently as compared to the multi-stage transmission depicted in FIG. 2, namely between the two spur-gear stages STS1, STS2.

In the example embodiment shown in FIG. 5, the carrier ST1 of the first planetary gear set PS1 is connected in a rotationally fixed manner to the drive shaft AN, i.e., the first connection element 1 and, therefore, to the sun gear SO2 of the second planetary gear set PS2. The sun gear SO1 of the first planetary gear set PS1 and the ring gear HO2 of the second planetary gear set PS2 and the first spur gear ST2a of the second spur-gear stage STS2 can be coupled to one another via the clutch K1. In the example embodiment depicted in FIG. 5, the clutch K4 is disposed between the second spur gear ST1b of the first spur-gear stage STS1 and the second spur gear ST2b of the second spur-gear stage STS2.

Figure 6:
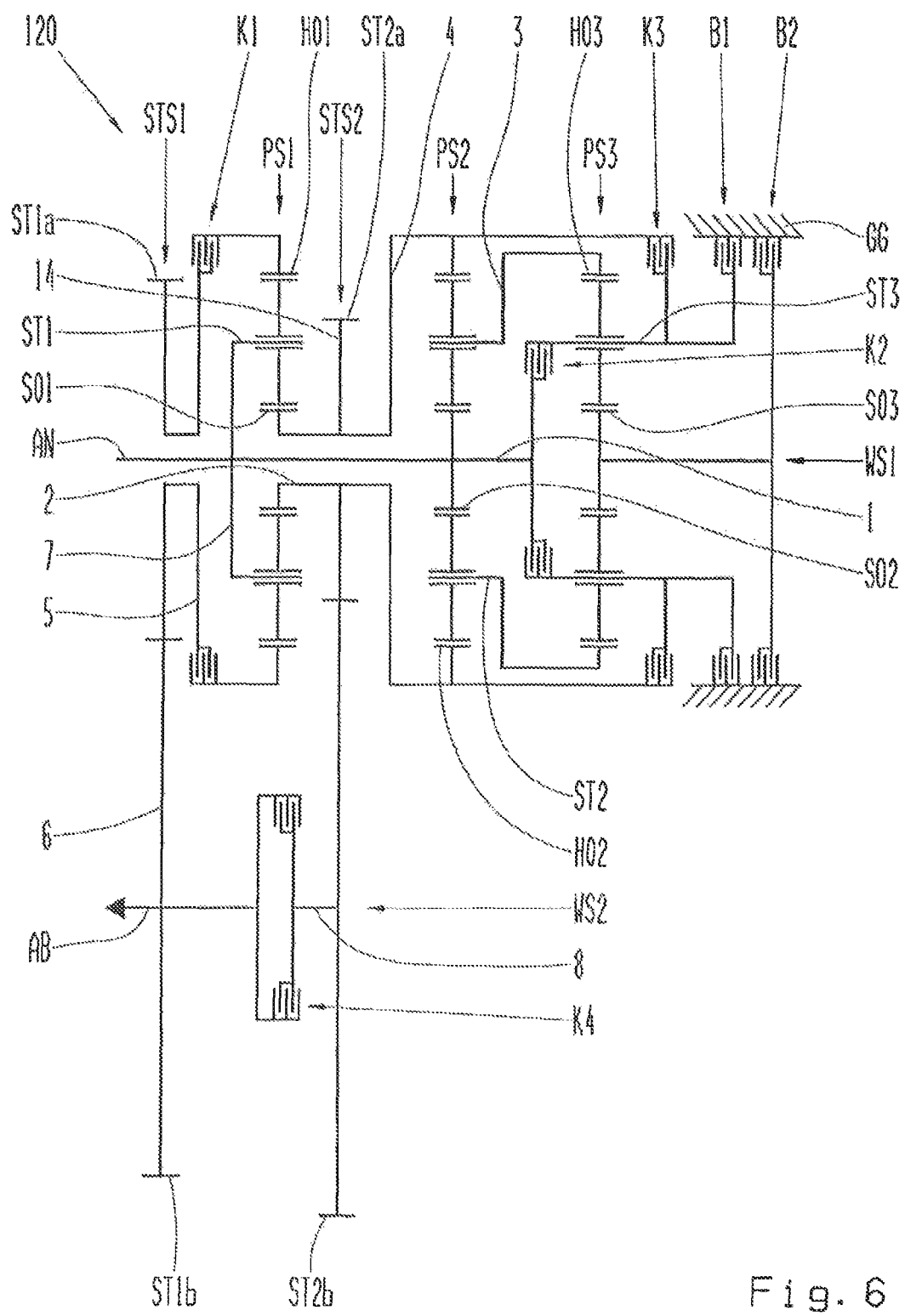

FIG. 6 shows a schematic depiction of another example embodiment of the first main system of the multi-stage transmission 120 previously described with reference to FIG. 2. This shows the second variant position for the clutch K1, which is labeled A2 in FIG. 4.

In the example embodiment depicted in FIG. 6 and as compared to the transmission 120 depicted in FIG. 4 and FIG. 5, the first spur-gear stage STS1 is axially displaced and is disposed on the opposite side of the first planetary gear set PS1 relative to the second planetary gear set PS2. Due to the axial displacement of the first spur-gear stage STS1, the seventh connection element 7 extends so as to be centered within the fifth connection element 5. The position of the fourth shift element K4 corresponds to the variant position previously shown in FIG. 5. The drive shaft AN is connected in a rotationally fixed manner to the carrier ST1 of the first planetary gear set PS1. The sun gear SO1 of the first planetary gear set PS1 is connected in a rotationally fixed manner to the ring gear HO2 of the second planetary gear set PS2. The first spur gear ST1a of the first spur gear stage STS1 can be coupled to the ring gear HO1 of the first planetary gear set PS1 via the first shift element K1.

Figure 7:
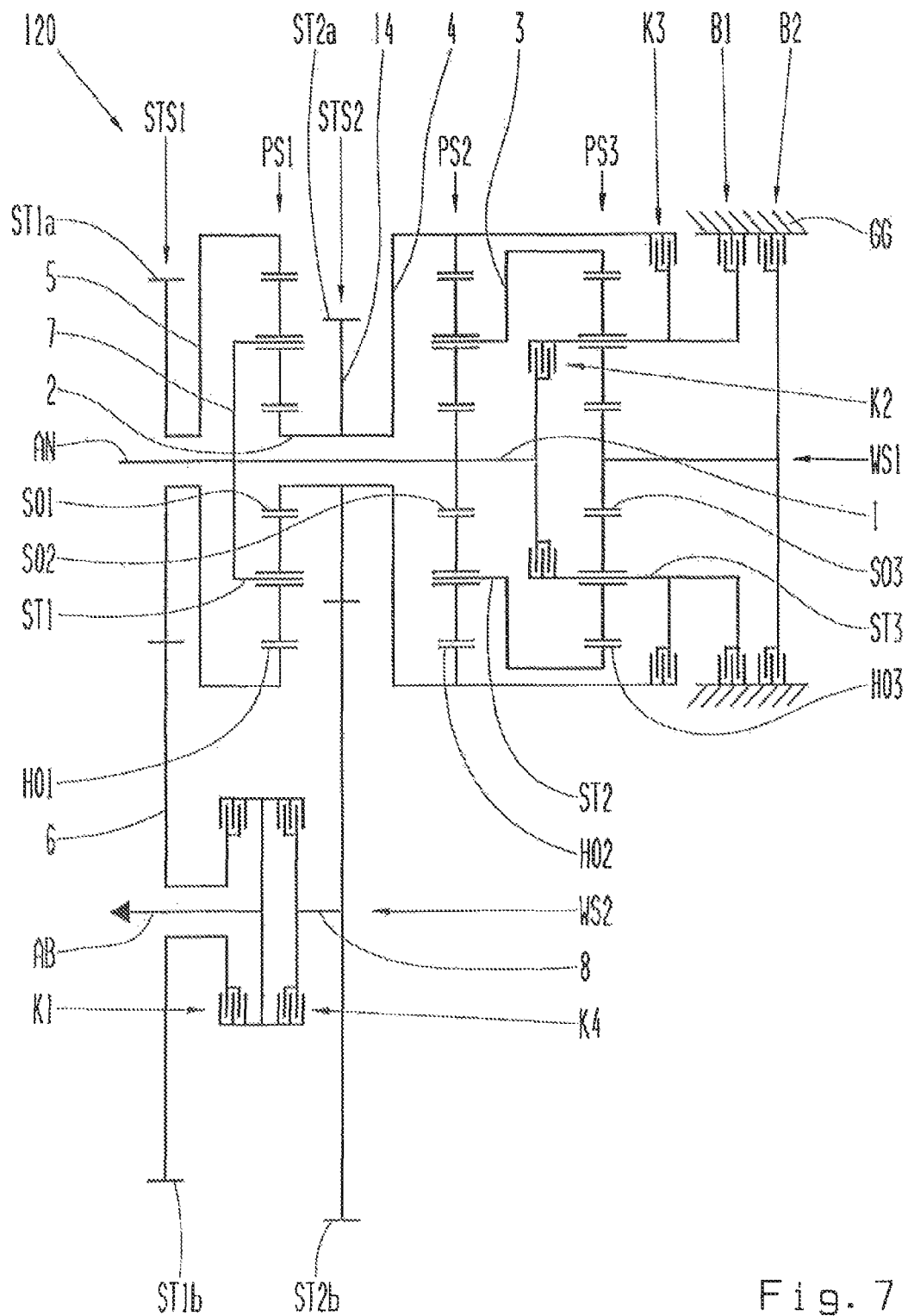

FIG. 7 shows a schematic depiction of another example embodiment of the first main system of the multi-stage transmission 120 previously described with reference to FIG. 2. This shows the third variant position for the clutch K1, which is labeled A3 in FIG. 4.

In the example embodiment shown in FIG. 7, the second spur gear ST1b of the first spur-gear stage STS1 can be coupled to the output shaft AB via the clutch K1. The position of the first spur-gear stage STS1 and the fourth clutch K4 corresponds to the variant position previously shown in FIGS. 5 and 6. The clutch K1 and the clutch K4 are disposed next to one another, wherein a clutch element of the two clutches K1, K4 is connected in a rotationally fixed manner to the output shaft AB. The first spur gear ST1a of the first spur-gear stage STS1 is connected in a rotationally fixed manner to the ring gear HO1 of the first planetary gear set PS1.

Figure 8:
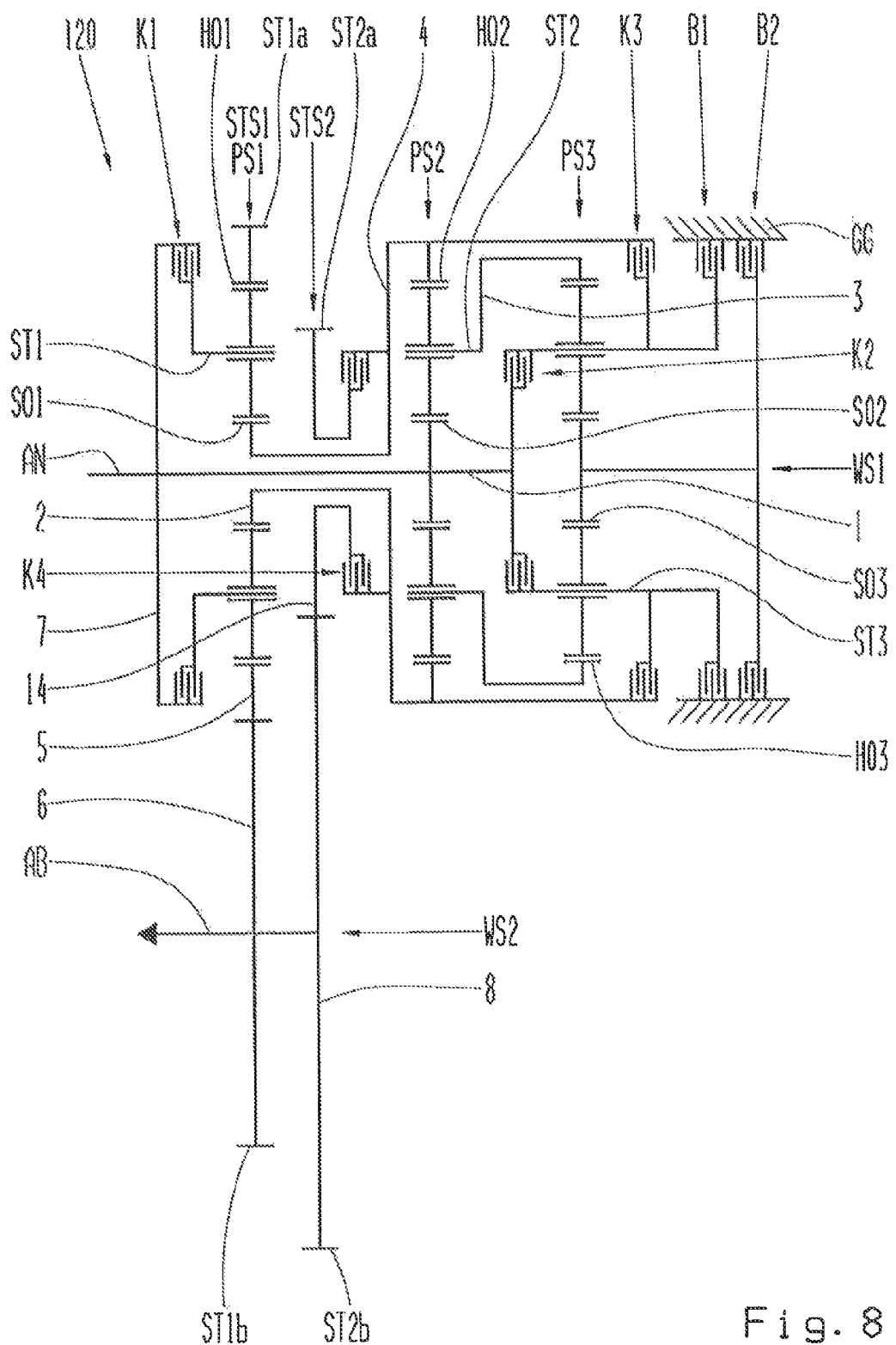

FIG. 8 shows a schematic depiction of another example embodiment of the first main system of the multi-stage transmission 120 previously described with reference to FIG. 2. This shows the variant position for the fourth clutch K4, which is labeled A4 in FIG. 4.

In the example embodiment shown in FIG. 8, the clutch K4 is disposed between the first spur gear ST2a of the second spur-gear stage STS2 and the rotationally-fixed connection of the ring gear HO2 of the second planetary gear set PS2 and the sun gear SO1 of the first planetary gear set PS1. Therefore, the first spur gear ST2a of the second spur-gear stage STS2 and the ring gear HO2 of the second planetary gear set PS2 and the sun gear SO1 of the first planetary gear set PS1 can be coupled by means of the clutch K4. In this variant embodiment, the second spur gear ST2b of the second spur-gear stage STS2 is connected to the output shaft AB in a rotationally fixed manner. The transmission elements and couplings that are not described in more detail here correspond to the depiction in FIG. 4.

The power-shiftable multi-stage transmission 120 shown in FIGS. 2 and 4 to 8 can be implemented in an equally acting manner by disposing the first planetary gear set PS1 on the output shaft AB. The following FIGS. 9 to 11 show two variant embodiments and possible alternative variant interlockings of a multi-stage transmission 120, according to the invention, which has a planetary gear set on the output shaft AB. Such a multi-stage transmission 120 is referred to in the following as a second main system.

FIG. 9 shows a gear pattern of a power-shiftable multi-stage transmission 120 according to one example embodiment of the present invention. The example embodiment is based on the aforementioned second main system of a multi-stage transmission 120. The power-shiftable multi-stage transmission 120 can be the multi-stage transmission 120 shown with reference to FIG. 1. The multi-stage transmission 120, which is also referred to as a planetary power-shift transmission, is embodied as a 9-speed multi-stage transmission according to this example embodiment.

In comparison to the example embodiments of a multi-stage transmission 120 shown in FIGS. 2 and 4 to 8, the multi-stage transmission 120 shown in FIG. 9 does not comprise a first spur-gear stage STS1, although this does comprise the second spur-gear stage STS2 previously described with reference to FIG. 2, as well as two additional spur-gear stages STS3, STS4. Three spur-gear stages STS2, STS3, STS4 are therefore used in this case, instead of two spur-gear stages STS1, STS2, as shown in FIG. 2, for example, for the first main system. In this example embodiment, the first planetary gear set PS1 is positioned on the output shaft AB.

The multi-stage transmission 120 shown in FIG. 9 comprises two parallel shaft sections WS1, WS2, six shift elements K1, K2, K3, K4, B1, B2, three spur-gear stages STS2, STS3, STS4 and three planetary gear sets PS1, PS2, PS3, all of which are disposed in a housing GG of the planetary power-shift transmission 120. In this example embodiment, all three planetary gear sets PS1, PS2, PS3 are embodied as simple minus planetary gear sets, the respective ring gears HO1, HO2, HO3 of which rotate, with the carrier ST1, ST2, ST3 held, in the direction counter to the sun gear SO1, SO2, SO3. The second and third planetary gear sets PS2, PS3 are disposed in the axial direction coaxially and successively in the sequence "PS2, PS3" on the first shaft section WS1 of the two parallel shaft sections WS1, WS2.

A first spur gear ST3a of a third spur-gear stage STS3 of the three spur-gear stages STS2, STS3, STS4, a first spur gear ST4a of the fourth spur-gear stage STS4, and a first spur gear ST2a of a second spur-gear stage STS2 of the three spur-gear stages STS2, STS3, STS4, are disposed coaxially and successively on the first shaft section WS1 upstream of the second planetary gear set PS2. The result thereof is a sequence of "ST3a, ST4a, ST2a, PS2, PS3".

The drive shaft AN is disposed on the first shaft section WS1, and the output shaft AB is disposed on a second shaft section WS2 of the two parallel shaft sections WS1, WS2. In addition, the two shaft sections WS1, WS2 are connected to one another via the three spur-gear stages STS2, STS3, STS4.

The shift elements K1, K2, K3, K4 are designed as clutches, the two shift elements B1, B2 are designed as brakes and are also referred to as such in the following. Different transmission ratios between the drive shaft AN and the output shaft AB can be implemented by means of a selective engagement of the six shift elements K1, K2, K3, K4, B1, B2. At least nine forward gears and at least one reverse gear can be implemented in this manner.

A coupling of the individual elements of the three planetary gear sets PS1, PS2, PS3 to one another, to the three spur-gear stages STS2, STS3, STS4 and to the drive shaft AN and to the output shaft AB is described in the following.

The planetary power-shift transmission 120 comprises at least nine connection elements, which are labeled 1, 3, 4, 8, 9, 10, 11, 12, 13. The connection elements 1, 3, 4, 8, 9, 10, 11, 12, 13 can be embodied as shafts, wherein shift elements, in particular clutches, can also be disposed within the connection elements 1, 3, 4, 8, 9, 10, 11, 12, 13, as is described in more detail in the following.

As shown in FIG. 9, a sun gear SO2 of a second planetary gear set PS2 of the three planetary gear sets PS1, PS2, PS3, and the drive shaft AN are connected to one another in a rotationally fixed manner and form a first connection element 1. A ring gear HO3 of a third planetary gear set PS3 of the three planetary gear sets PS1, PS2, PS3, and the carrier ST2 of the second planetary gear set PS2 are connected to one another in a rotationally fixed manner and form a third connection element 3. A ring gear HO2 of the second planetary gear set PS2 is connected to the first spur gear ST2a of the second spur-gear stage STS2. A second spur gear ST2b of the second spur-gear stage STS2, and the output shaft AB are connected and form an eighth connection element 8. The fourth shift element K4 is disposed in the eighth connection element 8. A first spur gear ST4a of the fourth spur-gear stage STS4 is connected to the ring gear HO2 of the second planetary gear set PS2. As is implicitly described, the first spur gear ST4a of the fourth spur-gear stage STS4, the first spur gear ST2a of the second spur-gear stage STS2, and the ring gear HO2 of the second planetary gear set PS2 are connected to one another, thereby resulting in a fourth, a ninth, and a fourteenth connection element 4, 9, 14. Each of the connection elements 4, 9, 14 connects a common connection point to the first spur gear ST4a of the fourth spur-gear stage STS4, to the first spur gear ST2a of the second spur-gear stage STS2, and to the ring gear HO2 of the second planetary gear set PS2, respectively. As a result, the fourth connection element establishes a connection between the common connection point and the ring gear HO2 of the second planetary gear set. The ninth connection element establishes a connection between the common connection point and the first spur gear ST4a of the fourth spur-gear stage STS4, and the fourteenth connection element 14 establishes a connection between the common connection point and the first spur gear ST2a of the second spur-gear stage STS2. The ring gear HO1 of the first planetary gear set PS1 is connected to the output shaft AB in a rotationally fixed manner and forms a tenth connection element 10. The carrier ST1 of the first planetary gear set PS1 is connected to the second spur gear ST4b of the fourth spur-gear stage STS4 and forms an eleventh connection element 11. The sun gear SO1 of the first planetary gear set PS1 is connected to the second spur gear ST3b of the third spur-gear stage STS3 and forms a twelfth connection element 12. The drive shaft AN is connected or coupleable to the first spur gear ST3a of the third spur-gear stage STS3 via the first shift element K1, which is the clutch K1 in this case, and forms a thirteenth connection element 13.

The thirteenth connection element 13 comprises the first shift element K1 of the six shift elements K1, K2, K3, K4, B1, B2, wherein the first shift element K1 is disposed in the power flow between the drive shaft AN and the first spur gear ST3a of the third spur-gear set STS3. A second shift element K2 of the six shift elements K1, K2, K3, K4, B1, B2 is disposed in the power flow between the drive shaft AN and a carrier ST3 of the third planetary gear set PS3. A third shift element K3 of the six shift elements K1, K2, K3, K4, B1, B2 is disposed in the power flow between the fourth connection element 4 of the ring gear HO2 of the second planetary gear set PS2 to the first spur gear ST2a of the second spur-gear stage STS2 and the carrier ST3 of the third planetary gear set PS3. The eighth connection element 8 comprises a fourth shift element K4 of the six shift elements K1, K2, K3, K4, B1, B2, wherein the fourth shift element K4 is disposed in the power flow between the second spur gear ST2b of the second spur-gear stage STS2 and the output shaft AB. A fifth shift element B1—the brake B1 in this case—of the six shift elements K1, K2, K3, K4, B1, B2 is disposed in the power flow between the carrier ST3 of the third planetary gear set PS3 and a transmission housing GG. A sixth shift element B2 of the six shift elements K1, K2, K3, K4, B1, B2 is disposed in the power flow between the sun gear SO3 of the third planetary gear set PS3 and the transmission housing GG.

One gear set can be positioned on the output shaft AB in order to save axial construction space. The gear set PS1 is best suited therefor. An additional spur-gear stage is required therefor, however. This option is depicted for the second main system in FIGS. 9 to 11. FIG. 9 shows a gear pattern of the second main system having the first planetary gear set PS1 on the output shaft AB. A plurality of variant embodiments are possible for this system as well, as is shown in FIG. 10. FIG. 11 shows an alternative positioning of the first planetary gear set PS1 on the output shaft AB.

FIG. 10 shows a schematic depiction of a further example embodiment of the second main system of the multi-stage transmission 120, which was previously described with reference to FIG. 9. This is a variant interlocking of the multi-stage transmission 120 that is functionally identical to the second main system described with reference to FIG. 9.

The gear pattern depicted in FIG. 10 corresponds to the gear pattern of a multi-stage transmission 120 depicted in FIG. 9, from which a plurality of functionally identical, variant transmissions can be derived, wherein there are four additional, functionally identical, variant positions for the first shift element K1, i.e., the clutch K1, and one other variant position is possible for the fourth shift element K4, i.e., the clutch K4. The four variant positions for the clutch K1 are labeled A5, A6, A7, A8 in FIG. 10, and the variant position for the clutch K4 is labeled A4.

In a first variant position A5, the clutch K1 is disposed in the twelfth connection element 12 between the second spur gear ST3b of the third spur-gear set STS3 and the sun gear SO1 of the first planetary gear set PS1.

In a second variant position A6, the clutch K1 is disposed in the tenth connection element 10 between the ring gear HO1 of the first planetary gear set PS1 and the output shaft AB.

In a third variant position A7, the clutch K1 is disposed in the eleventh connection element 11 between the second spur gear ST4b of the fourth spur-gear stage STS4 and the carrier ST1 of the first planetary gear set PS1.

In a fourth variant position A8, the clutch K1 is disposed in the ninth connection element between the first spur gear ST4a of the fourth spur-gear stage STS4 and the common connection point of the fourth, ninth, and fourteenth connection elements.

One other variant position A9 results for the clutch K4 in addition to the variant position in the eighth connection element 8 between the output shaft AB and the second spur gear ST2b of the second spur-gear stage STS2. In this case, the clutch K4 is disposed in the fourteenth connection element 14 between the first spur gear ST2a of the second spur-gear stage STS2 and the common connection point of the fourth, ninth, and fourteenth connection elements.

FIG. 10 shows one of the ten possible variant positions for the clutches K1, K4, in which each of the five variant positions for the clutch K1 can be combined with the two variant positions for the clutch K4.

FIG. 10 therefore shows functionally identical, variant transmissions and gear patterns of the variant positions for the clutches K1, K4. As is the case for the first main systems having all planetary sets on the drive shaft AN, which is shown in FIGS. 2 and 3 to 8, an entire series of variant transmissions is also possible in the case of the second main systems having one gear set on the output shaft AB. These are largely identical to the variant transmissions of the first main system. There is one additional variant embodiment, however, due to the repositioning of the clutch K1. Other positions for the clutches K1, K4 are possible here as well, in a manner analogous to the first main system, without the function of the transmission 120 being changed as a result. These possible positions are depicted in FIG. 10. Four more possible positions (A5, A6, A7, A8) result for the clutch K1, for example. One more possible position (A9) results for the clutch K4.

FIG. 11 shows a gear pattern of the multi-stage transmission 120, as the second main system according to a further example embodiment of the present invention. In this case, the first planetary gear set PS1 is disposed on the output shaft AB.

In comparison to the example embodiments shown in FIGS. 9 and 10, the position of the planetary gear set PS1 and the connection of the third and fourth spur-gear stages STS3, STS4 has been varied. All transmission elements, connection elements, shafts, rotationally fixed connections, shift elements, and variant positions in the region of the first shaft section WS1 are identical to the example embodiment shown in FIG. 10. In addition, the eighth and tenth connection elements 8, 10 on the second shaft section WS2 correspond to the example embodiment shown in FIG. 10. The eleventh and twelfth connection elements 11, 12 have been changed as compared to the example embodiment shown in FIG. 10.

The eleventh connection element 11 connects the sun gear SO1 of the first planetary gear set PS1 to the second spur gear ST4a of the fourth spur-gear stage STS4. In the third variant embodiment, which is labeled A7 in FIG. 10, the clutch K1 is disposed in the region of the eleventh connection element 11.

The twelfth connection element 12 connects the second spur gear ST3b of the third spur-gear stage STS3 to the ring gear HO1 of the third planetary gear set PS1. In the first variant position, which is labeled A5 in FIG. 10, the clutch K1 is disposed in the region of the twelfth connection element 12.

The exact geometric position of the transmission elements (clutches, gear sets, spur gears, etc.) is flexible, and therefore individual planetary gear sets, spur gears, or clutches can also be exchanged or displaced, provided connectivity is possible.

FIGS. 12 and 13 show a hybridization of a multi-stage transmission according to the invention. In principle, an electric machine or any other type of force/power source can be disposed on each shaft of a multi-stage transmission according to any one of the example embodiments described.

FIG. 12 shows a schematic depiction of a power-shiftable multi-stage transmission 120, which is designed as a first main system and comprises a power source EM according to one example embodiment of the present invention. According to this example embodiment, the power source EM is designed as an electric machine EM. Therefore, this is a hybridization with an electric machine EM, which acts directly on the drive shaft AN of the multi-stage transmission 120, which is described with reference to FIG. 2 and is designed as a first main system.

According to this example embodiment, the multi-stage transmission 120 known from FIG. 2 additionally comprises an electric machine EM and an additional clutch K0 on the drive shaft AN. In the first shaft section WS1, the electric machine EM as the load source, and the clutch K0 are additionally disposed between an internal combustion engine, which drives the drive shaft AN and which is shown in FIG. 1, for example, and the electric machine EM. The clutch K0, the electric machine EM, the two spur-gear stages STS1, STS2, and the three planetary gear sets PS1, PS2, PS3 are disposed coaxially and successively on the first shaft section WS1 in the axial direction in the sequence "K0, EM, PS1, STS1, STS2, PS2, PS3". The electric machine acts directly on the drive shaft. The hybridization is possible with all the example embodiments described and shown in FIGS. 1 to 11. The connection of the electric machine EM to the drive shaft AN is a variant embodiment presented as an example, wherein, in principle, an electric machine or any other source of force or power can be disposed on each shaft of a planetary power-shift transmission according to the invention.

If the additional clutch K0, in addition to the electric machine EM, is placed between an internal combustion engine as shown in FIG. 1, for example, and the electric machine EM, as shown in FIG. 12, it is possible to drive all gears—as described with reference to FIG. 3, for example— both forward and in reverse, exclusively electrically. To this end, the internal combustion engine is decoupled by the disengaged clutch K0.

In addition to the hybridization with an electric machine EM directly on the drive shaft AN, as shown in FIG. 12, a hybridization with an electric machine EM axially parallel to the drive shaft AN is conceivable, as is described with reference to FIG. 13.

FIG. 13 shows a schematic depiction of a power-shiftable multi-stage transmission 120 comprising a power source EM, according to one example embodiment of the present invention. The power source EM is designed as an electric machine EM, similarly to the example embodiment described with reference to FIG. 12. Therefore, this is a hybridization with an electric machine EM, which is disposed axially parallel to the drive shaft AN of the example embodiment of a multi-stage transmission 120 described with reference to FIG. 6.

In this example embodiment, as compared to the example embodiment shown in FIG. 12, the electric machine EM is not directly connected to the first connection element in a rotationally fixed manner, but rather is coupled to the first connection element via a fifth spur-gear stage STS5. The electric machine EM is disposed axially parallel to the shaft sections, on the side of the first shaft section opposite the second shaft section. The arrangement of the planetary gear sets PS1, PS2, PS3 and the spur-gear stages STS1, STS2, and the connections or mutual interlockings correspond to the example embodiment of the present invention shown in FIG. 6.

The configurations of the gear sets and clutches described above also make it possible to use a multi-stage transmission according to the concept described as a front transverse system. This is achieved despite the low number of planetary sets in the multi-stage transmission.

The example embodiments described and shown in the figures are selected merely as examples. Different example embodiments can be combined with one another in entirety or in terms of individual features. It is also possible to add features of one example embodiment to another example embodiment. If an example embodiment has an "and/or" statement between a first feature and a second feature, this is intended to mean that the example embodiment according to one embodiment has both the first feature and the second feature and, according to a further embodiment, has either only the first feature or only the second feature. In addition to the embodiments and example embodiments described as examples, the planetary sets and the shift elements can have other spatial positions per se and with respect to one another that do not affect the function of the described transmission.

In particular, different gear increments can result for all the example embodiments of the transmission family depicted and described, using the same gear pattern and depending on the stationary transmission ratio of the individual planetary sets, thereby making it possible to obtain an application-specific or vehicle-specific variation. In addition, it is possible to provide additional freewheels at each suitable location in the multi-staged transmission, for example, between a shaft and the housing, or possibly to connect two shafts. According to the invention, an axle differential and/or a distributor differential can be disposed on the drive side or on the output side. The multi-stage transmission according to the invention can be advantageously developed accordingly, for example, by disposing a torsional-vibration damper between the drive motor and the transmission. In addition, the drive shaft AN can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element. It is also possible to dispose such a start-up element in the power flow direction downstream of the transmission wherein, in this case, the drive shaft AN is permanently connected to the crankshaft of the drive motor.

In addition to the hybridization of a multi-stage transmission according to the invention, it is possible in a further, non-illustrated embodiment of the invention, to dispose a wear-free brake, such as a hydraulic or electric retarder, for example, on each shaft, preferably on the drive shaft AN or the output shaft AB, which is of special significance for use in commercial vehicles in particular. Furthermore, a power take-off drive can be provided on each shaft, preferably on the drive shaft AN or the output shaft AB, for driving additional assemblies.

REFERENCE CHARACTERS

100 vehicle
110 engine
120 planetary power-shift transmission
AN drive shaft
AB output shaft
WS1 first shaft section
WS2 second shaft section
K1 shift element, clutch
K2 shift element, clutch
K3 shift element, clutch
K4 shift element, clutch
B1 shift element, brake
B2 shift element, brake
PS1 first planetary gear set
PS2 second planetary gear set
PS3 third planetary gear set
SO1 sun gear
SO2 sun gear
SO3 sun gear
HO1 ring gear
HO2 ring gear
HO3 ring gear
ST1 carrier
ST2 carrier
ST3 carrier
STS1 first spur-gear stage
STS2 second spur-gear stage
STS3 third spur-gear stage
ST1*a* first spur gear
ST1*b* second spur gear
ST2*a* first spur gear
ST2*b* second spur gear
ST3*a* first spur gear
ST3*b* second spur gear
ST4*a* first spur gear
ST4*b* second spur gear
1 first connection element
2 second connection element
3 third connection element
4 fourth connection element
5 fifth connection element
6 sixth connection element
7 seventh connection element
8 eighth connection element
9 ninth connection element
10 tenth connection element
11 eleventh connection element 12 twelfth connection element
13 thirteenth connection element
GG transmission housing
EM power source/electric machine

The invention claimed is:
1. A power-shiftable multi-stage transmission (120) of a planetary design, for a vehicle (100), for installation between a drive shaft (AN) and an output shaft (AB), the mufti-stage transmission comprising:
first and second parallel shaft sections (WS1, WS2);
first, second, third and fourth clutches (K1, K2, K3, K4) and first and second brakes (B1, B2);
at least first and second spur-gear stages (STS1, STS2);
first, second and third planetary gear sets (PS1, PS2, PS3); and
each of the first, the second and the third planetary gear sets (PS1, PS2, PS3) comprising a sun gear (SO1, SO2, SO3), a ring gear (HO1, HO2, HO3), and a planet carrier (ST1, ST2, ST3) supporting a plurality of planetary gears;
wherein the first and the second shaft sections (WS1, WS2) are connectable to one another via at least the first and the second spur-gear stages (STS1, STS2);
each of the first shift brake (B1), the second shift clutch (K2) and the third shift clutch (K3) are directly connected to the planet carrier of the third planetary gear set (PS3) for coupling the planet carrier of the third planetary gear set (PS3) to other components of the mufti-stage transmission (120);
different transmission ratios between the drive shaft (AN) and the output shaft (AB) are implemented by selective engagement of the first, the second, the third, and the fourth clutches (K1, K2, K3, K4) and first and second brakes (B1, B2) such that nine forward gears, and at least one reverse gear, are implementable.

2. The power-shiftable multi-stage transmission (120) according to claim 1, wherein:
the first, the second and the third planetary gear sets (PS1, PS2, PS3) and the drive shaft (AN) are disposed on the first shaft section (WS1);
the output shaft (AB) is disposed on the second shaft section (WS2);
the first and the second parallel shaft sections (WS1, WS2) are connected to one another via the at least first and the second spur-gear stages (STS1, STS2);
the sun gear (SO2) of the second planetary gear set (PS2) and the drive shaft (AN) are connected to one another in a rotationally fixed manner to form a first connection element (1);
the sun gear (SO1) of the first planetary gear set (PS1), a first spur gear (ST2a) of the second spur-gear stage (STS2), and the ring gear (HO2) of the second planetary gear set (PS2) are directly connected to one another and also form a second, a fourth, and a fourteenth connection element,
the second, the fourth, and the fourteenth connection elements (2, 4, 14) have a common connection point, and the second connection element (2) is connected to the sun gear (SO1) of the first planetary gear set (PS1), the fourth connection element (4) is connected to the ring gear (HO2) of the second planetary gear set (PS2), and the fourteenth connection element (14) is connected to the first spur gear (ST2a) of the second spur-gear stage (STS2);
the ring gear (HO3) of the third planetary gear set (PS3) and the carrier (ST2) of the second planetary gear set (PS2) are connected to one another in a rotationally fixed manner to form a third connection element (3);
a first spur gear (ST1a) of the first spur-gear stage (STS1) and a ring gear (HO1) of the first planetary gear set (PS1) form a fifth connection element (5);
a second spur gear (ST1b) of the first spur-gear stage (STS1) and the output shaft (AB) are connected to one another and form a sixth connection element (6);
the carrier (ST1) of the first planetary gear set (PS1) and the drive shaft (AN) are releasably connectable to one another and form a seventh connection element (7);
a second spur gear (ST2b) of the second spur-gear stage (STS2) and the output shaft (AB) form an eighth connection element (8);
the second shift clutch (K2) is disposed in a power flow between the drive shaft (AN) and the carrier (ST3) of the third planetary gear set (PS3);
the third shift clutch (K3) is disposed in a power flow between the fourth connection element (4) and the carrier (ST3) of the third planetary gear set (PS3);
the first shift brake (B1) is disposed in the power flow between the carrier (ST3) of the third planetary gear set (PS3) and a transmission housing (GG); and
the second shift brake (B2) is disposed in the power flow between the sun gear (SO3) of the third planetary gear set (PS3) and the transmission housing (GG).

3. The power-shiftable multi-stage transmission (120) according to claim 2, wherein the seventh connection element (7) further comprises the first shift clutch (K1), and the first shift clutch (K1) is disposed in a power flow between the drive shaft (AN) and the carrier (ST1) of the first planetary gear set (PS1).

4. The power-shiftable multi-stage transmission (120) according to claim 2, wherein the second connection element (2) comprises the first shift clutch (K1), the first shift clutch (K1) is disposed in the power flow between the first spur gear (ST2a) of the second spur-gear stage (STS2) and the sun gear (SO1) of the first planetary gear set.

5. The power-shiftable multi-stage transmission (120) according to claim 2, wherein the fifth connection element (5) comprises the first shift clutch (K1), the first shift clutch (K1) is disposed in the power flow between the ring gear (HO1) of the first planetary gear set (PS1) and the first spur gear (ST1a) of the first spur-gear stage (STS1).

6. The power-shiftable multi-stage transmission (120) according to claim 2, wherein the sixth connection element (6) comprises the first shift clutch (K1), the first shift clutch (K1) is disposed in the power flow between the second spur gear (ST1b) of the first spur-gear stage (STS1) and the output shaft (AB).

7. The power-shiftable multi-stage transmission (120) according to claim 2, wherein the eighth connection element (8) comprises the fourth shift clutch (K4), and the fourth shift clutch (K4) is disposed in the power flow between the second spur gear (ST2b) of the second spur-gear stage (STS2) and the output shaft (AB).

8. The power-shiftable multi-stage transmission (120) according to claim 2, wherein the fourteenth connection element (14) comprises the fourth shift clutch (K4), and the fourth shift clutch (K4) is disposed in a power flow between either the fourth connection element (4) or the ninth connection element (9) and the first spur gear (ST2a) of the second spur-gear stage (STS2).

9. The power-shiftable multi-stage transmission (120) according to claim 1, wherein the second and the third planetary gear sets (PS2, PS3) and the drive shaft (AN) are disposed on the first shaft section (WS1);

the first planetary gear set (PS1) and the output shaft (AB) are disposed on the second shaft section (WS2);

the first and the second parallel shaft sections (WS1, WS2) are connectable to one another via the first and the second spur-gear stages and a third spur-gear stage (STS2, STS3, STS4);

the sun gear (SO2) of the second planetary gear set (PS2) and the drive shaft (AN) are connected to one another in a rotationally fixed manner to form a first connection element (1);

the ring gear (HO3) of the third planetary gear set (PS3) and the carrier (ST2) of the second planetary gear set (PS2) are connected to one another in a rotationally fixed manner to form a third connection element (3);

the ring gear (HO2) of the second planetary gear set (PS2) and a first spur gear (ST2a) of the second spur-gear stage (STS2) are connected to form a fourth connection element (4);

a second spur gear (ST2b) of the second spur-gear stage (STS2) and the output shaft (AB) are connected to form an eighth connection element (8);

the first spur gear (ST2a) of the second spur-gear stage (STS2), a first spur gear (ST4a) of the first spur-gear stage (STS4) and the fourth connection element are connected, the connection between the first spur gear (ST4a) of the first spur-gear stage (STS4) and the fourth connection element (4) form a ninth connection element (9), and the connection between the first spur gear (ST2a) of the second spur-gear stage and the fourth and the ninth connection elements form a fourteenth connection element (14);

the output shaft (AB) and the ring gear (HO1) of the first planetary gear set (PS1) are connected to form a tenth connection element (10);

a first spur gear (ST3a) of a third spur-gear stage (STS3) and the drive shaft (AN) are connected to form a thirteenth connection element (13);

the drive shaft (AN) and the carrier (ST3) of the third planetary gear set (PS3) are connectable by the second shift clutch (K2);

the carrier (ST3) of the third planetary gear set (PS3), having the connection of the first spur gear (ST2a) of the second spur-gear stage, is connectable to the ring gear (HO2) of the second planetary gear set (PS2) by the third shift clutch (K3);

the first shift brake (B1) is disposed in the power flow between the carrier (ST3) of the third planetary gear set (PS3) and the transmission housing (GG); and the second shift brake (B2) is disposed in the power flow between the sun gear (SO3) of the third planetary gear set (PS3) and the transmission housing (GG); and either:

a second spur gear (ST4b) of the first spur-gear stage (STS4) and the carrier (ST1) of the first planetary gear set (PS1) are connected to form an eleventh connection element (11) and a second spur gear (ST3b) of the third spur-gear stage (STS3) and the sun gear (SO1) of the first planetary gear set (PS1) are connected to form a twelfth connection element (12), or the second spur gear (ST4b) of the first spur-gear stage (STS4) and the sun gear (SO1) of the first planetary gear set (PS1) are connected to form the eleventh connection element (11) and the second spur gear (ST3b) of the third spur-gear stage (STS3) and the carrier (ST1) of the first planetary gear set (PS1) are connected and form the twelfth connection element (12).

10. The power-shiftable multi-stage transmission (120) according to claim 9, wherein the thirteenth connection element (13) comprises the first shift clutch (K1), and the first shift clutch (K1) is disposed in the power flow between the drive shaft (AN) and the first spur gear (ST3a) of the third spur-gear stage (STS3).

11. The power-shiftable multi-stage transmission (120) according to claim 9, wherein either:
the twelfth connection element (12) comprises the first shift clutch (K1), or
the eleventh connection element (11) comprises the first shift clutch (K1).

12. The power-shiftable multi-stage transmission (120) according to claim 9, wherein either:
the tenth connection element (10) comprises the first shift clutch (K1), or
the ninth connection element (9) comprises the first shift clutch (K1).

13. The power-shiftable multi-stage transmission (120) according to claim 1, wherein an electric motor (EM) is disposed on the drive shaft (AN).

14. The power-shiftable multi-stage transmission (120) according to claim 1, wherein at least one of the first, the second and the third planetary gear sets (PS1, PS2, PS3) is a minus planetary gear set.

15. The power-shiftable mufti-stage transmission (120) according to claim 1, wherein:
a first forward gear is implemented by engagement of the third and the fourth clutches, and the second shift brake (K3, K4, B2),
a second forward gear is implemented by engagement of the second, the third, and the fourth shift clutches (K2, K3, K4),
a third forward gear is implemented by engagement of the second and the fourth shift clutches, and the second shift brake (K2, K4, B2),
a fourth forward gear is implemented by engagement of the first, the second, and the fourth shift clutches (K1, K2, K4),
a fifth forward gear is implemented by engagement of the first and the second shift clutches, and the second shift brake (K1, K2, B2),
a sixth forward gear is implemented by engagement of the first, the second, and the third shift clutches (K1, K2, K3),
a seventh forward gear is implemented by engagement of the first and the third shill clutches, and the second shift brake (K1, K3, B2),
an eighth forward gear is implemented by engagement of the first and the third shift clutches, and the first shift brake(K1, K3, B1),
a ninth forward gear is implemented by engagement of the first shift clutch and first and the second shift brake (K1, B1, B2), and
a reverse gear is implemented by engagement of the fourth shift clutch; and first and the second shift brake (K4, B1, B2).

16. A power-shiftable multi-stage transmission of a planetary design, for a vehicle, for installation between a drive shaft and an output shaft, the multi-stage transmission comprising:

first and second parallel shaft sections;
first, second, third and fourth clutches and first and second brakes;
at least first and second spur-gear stages, and each of the first and the second spur gear stages comprises a first spur gear and a second spur gear;
first, second and third planetary gear sets, and each of the first, the second and the third planetary gear sets comprising a sun gear, a ring gear, and a planet carrier supporting a plurality of planetary gears;
wherein the first and the second shaft sections are connectable via the first and the second spur-gear stages, and selective engagement of the first, the second, the third and the fourth shift elements and the first and the second shift brakes implements a plurality of transmission ratios between the drive shaft and the output shaft such that nine forward gears and at least one reverse gear are engagable, and
each of the first shift brake, the second shift clutch and the third shift clutch are directly connected to the planet carrier of the third planetary gear set for coupling the planet carrier of third planetary gear set to component of the multi-stage transmission.

17. The power-shiftable multi-stage transmission according to claim 16, wherein
the first, the second and the third planetary gear sets and the drive shaft are disposed on the first shaft section and the output shaft is disposed on the second shaft section, the first and the second shaft sections are connectable via the first and the second spur-gear stages;
the sun gear of the second planetary gear set and the drive shaft are connected to one another in a rotationally fixed manner to form a first connection element;
the sun gear of the first planetary gear set, the first spur gear of the second spur-gear stage, and the ring gear of the second planetary gear set are connected to one another via second, fourth, and fourteenth connection elements, the second, the fourth, and the fourteenth connection elements have a common connection point, and the second connection element is connected to the sun gear of the first planetary gear set, the fourth connection element is connected to the ring gear of the second planetary gear set, and the fourteenth connection element is connected to the first spur gear of the second spur-gear stage;
the ring gear of the third planetary gear set and the carrier of the second planetary gear set are connected to one another in a rotationally fixed manner to form a third connection element;
the first spur gear of the first spur-gear stage and the ring gear of the first planetary gear set are connectable to one another to form a fifth connection element;
the second spur gear of the first spur-gear stage and the output shaft are connected to form a sixth connection element;
the carrier of the first planetary gear set and the drive shaft are connected to one another to form a seventh connection element;
the second spur gear of the second spur-gear stage and the output shaft are connected to form an eighth connection element;
the second shift clutch is disposed in a power flow between the drive shaft and the carrier of the third planetary gear set;
the third shift clutch is disposed in the power flow between the fourth connection element and the carrier of the third planetary gear set.

18. The power-shiftable multi-stage transmission according to claim 16, wherein
the second and the third planetary gear sets and the drive shaft are disposed on the first shaft section, and the first planetary gear set and the output shaft are disposed on the second shaft section;
the first and the second shaft sections are connectable to one another via the first spur gear stage, the second spur gear stage and a third spur-gear stage, and the third spur gear stage comprises a first and a second spur gear;
the sun gear of the second planetary gear set and the drive shaft are connected to one another in a rotationally fixed manner to form a first connection element;
the ring gear of the third planetary gear set and the carrier of the second planetary gear set are connected to one another in a rotationally fixed manner to form a third connection element;
the ring gear of the second planetary gear set and the first spur gear of the second spur-gear stage are connected to form a fourth connection element;
the second spur gear of the second spur-gear stage and the output shaft are connected to form an eighth connection element;
the first spur gear of the second spur-gear stage, the first spur gear of the first spur-gear stage, and the fourth connection element are connected, and the connection between the first spur gear of the first spur-gear stage and the fourth connection element to form a ninth connection element,
the connection between the first spur gear of the second spur-gear stage and the fourth and the ninth connection elements form a fourteenth connection element;
the output shaft and the ring gear of the first planetary gear set are connected to form a tenth connection element;
the first spur gear of the third spur-gear stage and the drive shaft are connected to form a thirteenth connection element;
the drive shaft and the carrier of the third planetary gear set are connectable via the second shift clutch,
the carrier of the third planetary gear set is connectable, via the third shift clutch, to the first spur gear of the second spur-gear stage and the ring gear of the second planetary gear set;
the first shift brake is disposed in a power flow between the carrier of the third planetary gear set and the transmission housing;
the second shift brake is disposed in the power flow between the sun gear of the third planetary gear set and the transmission housing; and
either:
the second spur gear of the first spur-gear stage and the carrier of the first planetary gear set are connected to form an eleventh connection element, and the second spur gear of the third spur-gear stage and the sun gear of the first planetary gear set are connected to form a twelfth connection element, or
the second spur gear of the first spur-gear stage and the sun gear of the first planetary gear set are connected to form the eleventh connection element, and the second spur gear of the third spur-gear stage and the carrier of the first planetary gear set are connected to form the twelfth connection element.

19. The power-shiftable multi-stage transmission according to claim 16, wherein:
a first forward gear is implemented by engagement of the third and the fourth shift clutches and the second shift brake, a second forward gear is implemented by engagement of the second, the third, and the fourth shift clutches, a third forward gear is implemented by engagement of the second and the fourth shift clutches and the second shift brake, a fourth forward gear is implemented by engagement of the first, the second, and the fourth shift clutches, a fifth forward gear is implemented by engagement of the first and the second shift clutches and the second shift brake, a sixth forward gear is implemented by engagement of the first, the second, and the third shift clutches, a seventh forward gear is implemented by engagement of the first and the third shift clutches and the second shift brake, an eighth forward gear is implemented by engagement of the first and the third shift clutches and the first shift brake, a ninth forward gear is implemented by engagement of the first shift clutch and the first and the second shift brakes, and a reverse gear is implemented by engagement of the fourth shift clutch and the first and the second shift brakes.

* * * * *